(12) United States Patent
Tamai et al.

(10) Patent No.: US 8,592,060 B2
(45) Date of Patent: Nov. 26, 2013

(54) PERPENDICULAR MAGNETIC RECORDING MEDIA HAVING LOW MEDIUM NOISE AND SYSTEMS USING THE SAME

(75) Inventors: Ichiro Tamai, Kanagawa (JP); Yotsuo Yahisa, Kanagawa (JP); Akemi Hirotsune, Kanagawa (JP); Kiwamu Tanahashi, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 261 days.

(21) Appl. No.: 12/975,197

(22) Filed: Dec. 21, 2010

(65) Prior Publication Data
US 2012/0154948 A1 Jun. 21, 2012

(51) Int. Cl.
*G11B 5/66* (2006.01)
(52) U.S. Cl.
USPC ........................................ 428/831.2
(58) Field of Classification Search
None
See application file for complete search history.

(56) References Cited

U.S. PATENT DOCUMENTS

| | | | |
|---|---|---|---|
| 6,682,826 B2 * | 1/2004 | Shimizu et al. | 428/828 |
| 7,033,686 B2 | 4/2006 | Hirayama et al. | |
| 7,175,925 B2 | 2/2007 | Chen et al. | |
| 7,247,396 B2 * | 7/2007 | Nolan et al. | 428/831.2 |
| 7,368,185 B2 | 5/2008 | Hirayama et al. | |
| 7,407,719 B1 | 8/2008 | Girt et al. | |
| 7,498,093 B2 | 3/2009 | Shibata | |
| 7,510,788 B2 | 3/2009 | Kawada | |
| 7,641,989 B2 | 1/2010 | Takekuma et al. | |
| 7,662,492 B2 | 2/2010 | Choe et al. | |
| 7,736,765 B2 | 6/2010 | Wu et al. | |
| 7,781,079 B2 | 8/2010 | Kurita | |
| 2004/0247941 A1 | 12/2004 | Chen et al. | |
| 2005/0202286 A1 | 9/2005 | Chen et al. | |

(Continued)

FOREIGN PATENT DOCUMENTS

| | | |
|---|---|---|
| EP | 1 956 106 A2 | 8/2008 |
| JP | 2002-334424 | 11/2002 |

(Continued)

OTHER PUBLICATIONS

Shi et al., "Influence of Dual-Ru Intermediate Layers on Magnetic Properties and Recording Performance of CoCrPt—SiO2 Perpendicular Recording Media," Applied Physics Letters, vol. 87, No. 22, Nov. 2005, pp. 222503-222503-3, abstract only.

(Continued)

*Primary Examiner* — Holly Rickman
(74) *Attorney, Agent, or Firm* — Zilka-Kotab, PC

(57) ABSTRACT

In one embodiment, a perpendicular magnetic recording medium includes a substrate, a soft-magnetic underlayer above the substrate, a seed layer above the soft-magnetic underlayer, a first intermediate layer above the seed layer, a second intermediate layer above the first intermediate layer, a recording layer above the second intermediate layer, and a protective layer above the recording layer. The second intermediate layer includes an Ru alloy having an element selected from a group consisting of: Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, and Si in a range about 20 at. % to about 40 at. %. Other magnetic media and systems using this media are described according to more embodiments.

23 Claims, 20 Drawing Sheets

| | Seed Layer | 2nd Intermediate Layer | Hc (kOe) | Dn (nm) | d (nm) |
|---|---|---|---|---|---|
| Example1-1 | Ni-10at.%Cr-8at.%W (10nm) | Ru-30at.%Ti | 10.3 | 12.5 | 9.9 |
| Example1-2 | Ni-10at.%Cr-8at.%W (7nm) | Ru-30at.%Ti | 10.2 | 12.3 | 9.8 |
| Example1-3 | Ni-10at.%Cr-8at.%W (3nm) | Ru-30at.%Ti | 8.8 | 12.3 | 8.6 |
| Example1-4 | Ni-10at.%Cr-8at.%W (3nm) / Ni-37.5at.%Ta (4nm) | Ru-30at.%Ti | 9.1 | 12.4 | 8.7 |
| Example1-5 | Ta (2nm) | Ru-30at.%Ti | 8.4 | 11.6 | 7.9 |
| Comp. Ex. 1-1 | Ni-10at.%Cr-8at.%W (10nm) | Ru-10mol%TiO$_2$ | 9.8 | 16.0 | 10.0 |
| Comp. Ex. 1-2 | Ni-10at.%Cr-8at.%W (7nm) | Ru-10mol%TiO$_2$ | 9.6 | 16.6 | 9.8 |
| Comp. Ex. 1-3 | Ni-10at.%Cr-8at.%W (3nm) | Ru-10mol%TiO$_2$ | 8.1 | 22.3 | 8.7 |
| Comp. Ex. 1-4 | Ni-10at.%Cr-8at.%W (3nm) / Ni-37.5at.%Ta (4nm) | Ru-10mol%TiO$_2$ | 8.6 | 22.2 | 8.7 |
| Comp. Ex. 1-5 | Ta (2nm) | Ru-10mol%TiO$_2$ | 7.4 | 30.4 | 8.0 |

(56) References Cited

U.S. PATENT DOCUMENTS

| | | |
|---|---|---|
| 2006/0121319 A1 | 6/2006 | Wu et al. |
| 2006/0228587 A1* | 10/2006 | Kuboki .................. 428/829 |
| 2008/0204933 A1 | 8/2008 | Hailu et al. |
| 2009/0116137 A1 | 5/2009 | Takekuma et al. |
| 2009/0130346 A1* | 5/2009 | Osawa et al. ................... 428/31 |
| 2009/0195924 A1 | 8/2009 | Nemoto et al. |
| 2010/0009218 A1 | 1/2010 | Reiter et al. |
| 2010/0035085 A1* | 2/2010 | Jung et al. .................... 428/800 |
| 2010/0296200 A1* | 11/2010 | Iwasaki .................... 360/294 |

FOREIGN PATENT DOCUMENTS

| | | |
|---|---|---|
| JP | 2003-178412 | 6/2003 |
| JP | 2003-178413 | 6/2003 |
| JP | 2006-085742 | 3/2006 |
| JP | 04019703 B2 | 12/2007 |
| JP | 2009-059433 | 3/2009 |
| JP | 2009-116930 | 5/2009 |
| JP | 2009-281616 | 12/2009 |
| WO | WO2007/074913 * | 7/2007 |
| WO | 2010/035810 A1 | 1/2010 |

OTHER PUBLICATIONS

Srinivasan et al., "Effect of RuCoCr-Oxide Intermediate Layers on Growth, Microstructure, and Recording Performance of CoCrPt—$SiO_2$ Perpendicular Recording Media," Journal of Applied Physics, vol. 107, No. 3, Feb. 2010, pp. 033901-033901-6, abstract only.

Nemoto et al., "Designing Magnetics of Capped Perpendicular Media With Minor-Loop Analysis," 2008 Elsevier B.V., Journal of Magnetism and Magnetic Materials, vol. 320, Issue 22, Nov. 2008, pp. 3144-3150, Eighth Perpendicular Magnetic Recording Conference, abstract only.

* cited by examiner

| | Seed Layer | 2nd Intermediate Layer | Hc (kOe) | Dn (nm) | d (nm) |
|---|---|---|---|---|---|
| Example1-1 | Ni-10at.%Cr-8at.%W (10nm) | Ru-30at.%Ti | 10.3 | 12.5 | 9.9 |
| Example1-2 | Ni-10at.%Cr-8at.%W (7nm) | Ru-30at.%Ti | 10.2 | 12.3 | 9.8 |
| Example1-3 | Ni-10at.%Cr-8at.%W (3nm) | Ru-30at.%Ti | 8.8 | 12.3 | 8.6 |
| Example1-4 | Ni-10at.%Cr-8at.%W (3nm) / Ni-37.5at.%Ta (4nm) | Ru-30at.%Ti | 9.1 | 12.4 | 8.7 |
| Example1-5 | Ta (2nm) | Ru-30at.%Ti | 8.4 | 11.6 | 7.9 |
| Comp. Ex. 1-1 | Ni-10at.%Cr-8at.%W (10nm) | Ru-10mol%TiO$_2$ | 9.8 | 16.0 | 10.0 |
| Comp. Ex. 1-2 | Ni-10at.%Cr-8at.%W (7nm) | Ru-10mol%TiO$_2$ | 9.6 | 16.6 | 9.8 |
| Comp. Ex. 1-3 | Ni-10at.%Cr-8at.%W (3nm) | Ru-10mol%TiO$_2$ | 8.1 | 22.3 | 8.7 |
| Comp. Ex. 1-4 | Ni-10at.%Cr-8at.%W (3nm) / Ni-37.5at.%Ta (4nm) | Ru-10mol%TiO$_2$ | 8.6 | 22.2 | 8.7 |
| Comp. Ex. 1-5 | Ta (2nm) | Ru-10mol%TiO$_2$ | 7.4 | 30.4 | 8.0 |

FIG. 11

| | 2nd Intermediate Layer | Hc (kOe) | Dn (nm) |
|---|---|---|---|
| Example 1-6 | Ru-10at.%Ti-30at.%Ta | 10.1 | 12.4 |
| Example 1-7 | Ru-20at.%Ti-20at.%Ta | 10.4 | 12.1 |
| Example 1-8 | Ru-30at.%Ti-10at.%Ta | 10.2 | 11.8 |
| Example 1-9 | Ru-20at.%Ti-20at.%Nb | 10.1 | 11.9 |
| Example 1-10 | Ru-10at.%Ti-20at.%Si | 10.1 | 12.1 |
| Example 1-11 | Ru-20at.%Ti-10at.%Al | 10.3 | 12.1 |
| Example 1-12 | Ru-20at.%Ta-20at.%Nb | 10.2 | 12.3 |
| Example 1-13 | Ru-20at.%Al-20at.%Nb | 10.2 | 12.0 |
| Example 1-14 | Ru-20at.%Si-20at.%Nb | 10.1 | 12.6 |
| Example 1-15 | Ru-10at.%Si-30at.%Ta | 10.0 | 12.5 |
| Comp. Ex. 1-6 | Ru-10at.%Ti | 9.6 | 16.6 |
| Comp. Ex. 1-7 | Ru-10at.%Cr | 9.1 | 18.3 |
| Comp. Ex. 1-8 | Ru-10at.%W | 8.5 | 19.4 |
| Comp. Ex. 1-9 | Ru-10at.%Mo | 8.6 | 19.2 |
| Comp. Ex. 1-10 | Ru-40at.%Cr | 9.6 | 18.1 |
| Comp. Ex. 1-11 | Ru-40at.%W | 9.2 | 19.2 |
| Comp. Ex. 1-12 | Ru-40at.%Mo | 9.1 | 19.1 |
| Comp. Ex. 1-13 | Ru-5at.%Ti-5at.%Si | 9.4 | 16.9 |
| Comp. Ex. 1-14 | Ru-5at.%Ta-5at.%Si | 9.3 | 17.2 |
| Comp. Ex. 1-15 | Ru-5at.%Si-5at.%Cr | 9.5 | 17.1 |
| Comp. Ex. 1-16 | Ru-20at.%Cr-20at.%Mo | 9.3 | 18.6 |
| Comp. Ex. 1-17 | Ru-20at.%Cr-20at.%W | 9.4 | 18.8 |
| Comp. Ex. 1-18 | Ru-25at.%W-25at.%Mo | 9.1 | 19.3 |

FIG. 12

| | 2nd Intermediate Layer | Recording Layer | Hc (kOe) | Dn (nm) | d (nm) | Grain Boundary |
|---|---|---|---|---|---|---|
| Example 1-16 | Ru-30at.%Ti | (Co-10at.%Cr-20at.%Pt)-5mol%SiO$_2$-5mol%TiO$_2$ | 10.3 | 12.5 | 9.9 | 0.98 |
| Example 1-17 | Ru-30at.%Ti | (Co-10at.%Cr-20at.%Pt)-5mol%SiO$_2$-4mol%TiO$_2$ | 10.8 | 12.3 | 9.8 | 0.87 |
| Example 1-18 | Ru-30at.%Ti | (Co-10at.%Cr-20at.%Pt)-4mol%SiO$_2$-4mol%TiO$_2$ | 11.4 | 12.3 | 9.8 | 0.73 |
| Example 1-19 | Ru-30at.%Ti | (Co-10at.%Cr-20at.%Pt)-4mol%SiO$_2$-3mol%TiO$_2$ | 12.0 | 12.4 | 9.7 | 0.64 |
| Example 1-20 | Ru-30at.%Ti | (Co-10at.%Cr-20at.%Pt)-3mol%SiO$_2$-3mol%TiO$_2$ | 12.5 | 12.6 | 9.8 | 0.52 |
| Comp. Ex. 1-19 | Ru-10mol%TiO$_2$ | (Co-10at.%Cr-20at.%Pt)-5mol%SiO$_2$-5mol%TiO$_2$ | 9.8 | 16.0 | 10.0 | 1.00 |
| Comp. Ex. 1-20 | Ru-10mol%TiO$_2$ | (Co-10at.%Cr-20at.%Pt)-5mol%SiO$_2$-4mol%TiO$_2$ | 10.0 | 17.8 | 9.9 | 0.90 |
| Comp. Ex. 1-21 | Ru-10mol%TiO$_2$ | (Co-10at.%Cr-20at.%Pt)-4mol%SiO$_2$-4mol%TiO$_2$ | 10.5 | 20.1 | 9.8 | 0.75 |
| Comp. Ex. 1-22 | Ru-10mol%TiO$_2$ | (Co-10at.%Cr-20at.%Pt)-4mol%SiO$_2$-3mol%TiO$_2$ | 10.9 | 22.5 | 9.8 | 0.67 |
| Comp. Ex. 1-23 | Ru-10mol%TiO$_2$ | (Co-10at.%Cr-20at.%Pt)-3mol%SiO$_2$-3mol%TiO$_2$ | 10.4 | 26.9 | 9.9 | 0.51 |

FIG. 13

| | 2nd Intermediate Layer | Δθ50 (degree) | SNR (dB) | Signal Decay (%) |
|---|---|---|---|---|
| Example 2-1 | Ru-20at.%Ti | 2.9 | 22.5 | -0.1 |
| Example 2-2 | Ru-30at.%Ti | 2.9 | 22.9 | -0.2 |
| Example 2-3 | Ru-40at.%Ti | 3.0 | 22.6 | -0.2 |
| Example 2-4 | Ru-50at.%Ti | 3.0 | 22.3 | -0.2 |
| Comp. Ex. 2-1 | Ru-10mol%TiO$_2$ | 2.9 | 20.7 | -0.1 |
| Comp. Ex. 2-2 | Ru-4mol%Ta$_2$O$_5$ | 2.8 | 20.8 | -0.1 |
| Comp. Ex. 2-3 | Ru-10at.%Ti | 2.9 | 20.2 | -0.1 |
| Comp. Ex. 2-4 | Ru-20mol%TiO$_2$ | 3.7 | 19.4 | -1.8 |
| Comp. Ex. 2-5 | Ru-30mol%TiO$_2$ | 4.3 | 18.7 | -2.7 |
| Comp. Ex. 2-6 | Ru-40mol%TiO$_2$ | 5.1 | 18.1 | -4.2 |
| Comp. Ex. 2-7 | Ru-60at.%Ti | 3.5 | 20.3 | -8.5 |

FIG. 14

|  | 2nd Intermediate Layer | $O_2$ (%) | Hc (kOe) | SNR (dB) |
|---|---|---|---|---|
| Example 2-5 | Ru-30at.%Ti | 0 | 4.8 | 22.1 |
| Example 2-6 | Ru-30at.%Ti | 2 | 4.9 | 22.5 |
| Example 2-7 | Ru-30at.%Ti | 4 | 5 | 22.8 |
| Example 2-8 | Ru-30at.%Ti | 6 | 5 | 22.9 |
| Example 2-9 | Ru-30at.%Ti | 8 | 4.9 | 22.2 |
| Comp. Ex. 2-8 | Ru-10at.%Ti | 0 | 4.6 | 19.3 |
| Comp. Ex. 2-9 | Ru-10at.%Ti | 2 | 4.6 | 19.6 |
| Comp. Ex. 2-10 | Ru-10at.%Ti | 4 | 4.7 | 20.2 |
| Comp. Ex. 2-11 | Ru-10at.%Ti | 6 | 4.5 | 19.8 |
| Comp. Ex. 2-12 | Ru-10at.%Ti | 8 | 4.3 | 19.1 |

FIG. 15

| 2nd Intermediate Layer | $O_2$ (%) | Intensity (kcps) | $2q$ (degree) |
|---|---|---|---|
| Ru-30at.%Ti | 0 | 8.7 | 92.04 |
| Ru-30at.%Ti | 2 | 8.7 | 92.05 |
| Ru-30at.%Ti | 4 | 9.0 | 92.07 |
| Ru-30at.%Ti | 6 | 8.7 | 92.06 |
| Ru-30at.%Ti | 8 | 8.5 | 92.07 |
| Ru-10at.%Ti | 0 | 24.7 | 91.72 |
| Ru-10at.%Ti | 2 | 24.9 | 91.77 |
| Ru-10at.%Ti | 4 | 24.7 | 91.90 |
| Ru-10at.%Ti | 6 | 24.5 | 92.07 |
| Ru-10at.%Ti | 8 | 22.6 | 91.99 |
| - | 0 | 8.7 | 92.06 |

FIG. 16

| | 2nd Intermediate Layer | 2nd Intermediate Layer Thickness (nm) | Hc (kOe) | Δθ50 (degree) | SNR (dB) |
|---|---|---|---|---|---|
| Example 2-10 | Ru-30at.%Ti | 0.5 | 4.9 | 2.9 | 22.4 |
| Example 2-11 | Ru-30at.%Ti | 0.8 | 5 | 2.9 | 23 |
| Example 2-12 | Ru-30at.%Ti | 1 | 5 | 3.0 | 22.9 |
| Example 2-13 | Ru-30at.%Ti | 1.5 | 5 | 3.0 | 22.7 |
| Example 2-14 | Ru-30at.%Ti | 2 | 4.9 | 3.1 | 22.5 |
| Comp. Ex. 2-13 | Ru-30at.%Ti | 0.2 | 4.2 | 2.8 | 19.3 |
| Comp. Ex. 2-14 | Ru-30at.%Ti | 0.4 | 4.6 | 2.8 | 20.4 |
| Comp. Ex. 2-15 | Ru-30at.%Ti | 2.5 | 4.4 | 3.8 | 19.7 |
| Comp. Ex. 2-16 | Ru-10mol%TiO$_2$ | 0.5 | 4.2 | 2.8 | 19.9 |
| Comp. Ex. 2-17 | Ru-10mol%TiO$_2$ | 1 | 4.5 | 2.8 | 20.2 |
| Comp. Ex. 2-18 | Ru-10mol%TiO$_2$ | 1.5 | 4.6 | 2.9 | 20.3 |
| Comp. Ex. 2-19 | Ru-10mol%TiO$_2$ | 2 | 4.4 | 3.3 | 19.6 |
| Comp. Ex. 2-20 | Ru-10mol%TiO$_2$ | 2.5 | 4.1 | 3.7 | 19.1 |
| Comp. Ex. 2-21 | Ru-10mol%TiO$_2$ | 3 | 3.7 | 4.2 | 18.4 |

FIG. 17

|  | 2nd Intermediate Layer | O2 (%) | Hc (kOe) | Δθ50 (degree) | SNR (dB) |
|---|---|---|---|---|---|
| Example 3-1 | Ru-30at.%Ti | 6.0 | 5.0 | 3.0 | 22.9 |
| Example 3-2 | Ru-20at.%Ti-10mol%TiO$_2$ | 1.8 | 5.0 | 2.9 | 23.0 |
| Example 3-3 | Ru-15at.%Ti-15mol%TiO$_2$ | 0 | 5.1 | 2.9 | 23.1 |
| Comp. Ex. 3-1 | Ru-10at.%Ti-20mol%TiO$_2$ | 0 | 4.5 | 3.4 | 20.4 |
| Comp. Ex. 3-2 | Ru-5at.%Ti-25mol%TiO$_2$ | 0 | 4.1 | 3.8 | 19.6 |
| Comp. Ex. 3-3 | Ru-30mol%TiO$_2$ | 0 | 3.6 | 4.3 | 18.7 |

FIG. 18

| | Seed Layer | 1st Intermediate Layer | | | 2nd Intermediate Layer | SNR (dB) | OW (dB) |
|---|---|---|---|---|---|---|---|
| | | 1-1 PAr0.6Pa | 1-2 PAr2Pa | 1-3 PAr4.6Pa | | | |
| Example 4-1 | Ni-10at.%Cr-8at.%W (7nm) | Ru (10nm) | Ru (5nm) | Ru (5nm) | Ru-20at.%Ti-10mol%TiO$_2$ | 23.3 | 26.4 |
| Example 4-2 | Ni-10at.%Cr-8at.%W (7nm) | Ru (5nm) | - | Ru (10nm) | Ru-20at.%Ti-10mol%TiO$_2$ | 23.4 | 28.3 |
| Example 4-3 | Ni-10at.%Cr-8at.%W (7nm) | Ru (4nm) | Ru (5nm) | Ru (5nm) | Ru-20at.%Ti-10mol%TiO$_2$ | 23.0 | 28.8 |
| Example 4-4 | Ni-10at.%Cr-8at.%W (7nm) | Ru (2nm) | Ru (3nm) | Ru (3nm) | Ru-20at.%Ti-10mol%TiO$_2$ | 22.9 | 29.5 |
| Example 4-5 | Ni-18at.%Fe-6at.%W (7nm) | Ru (4nm) | Ru (5nm) | Ru (5nm) | Ru-20at.%Ti-10mol%TiO$_2$ | 23.2 | 30.2 |
| Example 4-6 | Ni-18at.%Fe-6at.%W (3nm) | Ru (4nm) | Ru (5nm) | Ru (5nm) | Ru-20at.%Ti-10mol%TiO$_2$ | 23.1 | 30.3 |
| Example 4-7 | Co-9.4at.%Fe-6at.%W (7nm) | Ru (4nm) | Ru (5nm) | Ru (5nm) | Ru-20at.%Ti-10mol%TiO$_2$ | 22.8 | 30.5 |
| Example 4-8 | Co-9.4at.%Fe-6at.%W (3nm) | Ru (4nm) | Ru (5nm) | Ru (5nm) | Ru-20at.%Ti-10mol%TiO$_2$ | 23.0 | 30.7 |
| Comp. Ex. 4-1 | Ni-10at.%Cr-8at.%W (7nm) | Ru (10nm) | Ru (5nm) | Ru (5nm) | Ru-10mol%TiO$_2$ | 20.5 | 26.7 |
| Comp. Ex. 4-2 | Ni-10at.%Cr-8at.%W (7nm) | Ru (5nm) | - | Ru (10nm) | Ru-10mol%TiO$_2$ | 20.3 | 28.5 |
| Comp. Ex. 4-3 | Ni-10at.%Cr-8at.%W (7nm) | Ru (4nm) | Ru (5nm) | Ru (5nm) | Ru-10mol%TiO$_2$ | 20.2 | 29.0 |
| Comp. Ex. 4-4 | Ni-10at.%Cr-8at.%W (7nm) | Ru (2nm) | Ru (3nm) | Ru (3nm) | Ru-10mol%TiO$_2$ | 18.9 | 29.7 |
| Comp. Ex. 4-5 | Ni-18at.%Fe-6at.%W (7nm) | Ru (4nm) | Ru (5nm) | Ru (5nm) | Ru-10mol%TiO$_2$ | 19.8 | 30.8 |
| Comp. Ex. 4-6 | Ni-18at.%Fe-6at.%W (3nm) | Ru (4nm) | Ru (5nm) | Ru (5nm) | Ru-10mol%TiO$_2$ | 19.5 | 31.2 |
| Comp. Ex. 4-7 | Co-9.4at.%Fe-6at.%W (7nm) | Ru (4nm) | Ru (5nm) | Ru (5nm) | Ru-10mol%TiO$_2$ | 19.7 | 32.4 |
| Comp. Ex. 4-8 | Co-9.4at.%Fe-6at.%W (3nm) | Ru (4nm) | Ru (5nm) | Ru (5nm) | Ru-10mol%TiO$_2$ | 19.3 | 32.7 |

FIG. 19

| | 2nd Intermediate Layer | 1st Recording Layer | Hc (kOe) | SNR (dB) | OW (dB) | Re (%) |
|---|---|---|---|---|---|---|
| Example 5-1 | Ru-20at.%Ti-10mol%TiO$_2$ | (Co-10at.%Cr-20at.%Pt)-5mol%SiO$_2$-5mol%TiO$_2$ (4.0nm) | 5.0 | 23.0 | 28.8 | 7.1 |
| Example 5-2 | Ru-20at.%Ti-10mol%TiO$_2$ | (Co-10at.%Cr-20at.%Pt)-5mol%SiO$_2$-5mol%TiO$_2$ (3.8nm) | 5.0 | 23.2 | 28.9 | 7.4 |
| Example 5-3 | Ru-20at.%Ti-10mol%TiO$_2$ | (Co-10at.%Cr-20at.%Pt)-4mol%SiO$_2$-4mol%TiO$_2$ (3.6nm) | 5.1 | 23.3 | 28.6 | 7.6 |
| Example 5-4 | Ru-20at.%Ti-10mol%TiO$_2$ | (Co-10at.%Cr-20at.%Pt)-4mol%SiO$_2$-4mol%TiO$_2$ (3.3nm) | 5.2 | 23.4 | 28.5 | 8.2 |
| Example 5-5 | Ru-20at.%Ti-10mol%TiO$_2$ | (Co-10at.%Cr-20at.%Pt)-3mol%SiO$_2$-3mol%TiO$_2$ (3.0nm) | 5.0 | 23.6 | 29.1 | 8.6 |
| Comp. Ex. 5-1 | Ru-10mol%TiO$_2$ | (Co-10at.%Cr-20at.%Pt)-5mol%SiO$_2$-5mol%TiO$_2$ (4.0nm) | 4.6 | 20.3 | 29.2 | 6.8 |
| Comp. Ex. 5-2 | Ru-10mol%TiO$_2$ | (Co-10at.%Cr-20at.%Pt)-5mol%SiO$_2$-5mol%TiO$_2$ (3.8nm) | 4.6 | 20.4 | 29.2 | 7.0 |
| Comp. Ex. 5-3 | Ru-10mol%TiO$_2$ | (Co-10at.%Cr-20at.%Pt)-4mol%SiO$_2$-4mol%TiO$_2$ (3.6nm) | 4.7 | 20.5 | 29.4 | 7.2 |
| Comp. Ex. 5-4 | Ru-10mol%TiO$_2$ | (Co-10at.%Cr-20at.%Pt)-4mol%SiO$_2$-4mol%TiO$_2$ (3.3nm) | 4.4 | 20.1 | 29.6 | 7.3 |
| Comp. Ex. 5-5 | Ru-10mol%TiO$_2$ | (Co-10at.%Cr-20at.%Pt)-3mol%SiO$_2$-3mol%TiO$_2$ (3.0nm) | 4.2 | 19.4 | 30.1 | 7.4 |

FIG. 20

PERPENDICULAR MAGNETIC RECORDING MEDIA HAVING LOW MEDIUM NOISE AND SYSTEMS USING THE SAME

FIELD OF THE INVENTION

The present invention relates to magnetic recording media, and more specifically, to perpendicular magnetic recording media capable of recording a large volume of data while providing for low medium noise.

BACKGROUND OF THE INVENTION

In order to increase the recording density of current hard disk drives (HDDs), medium noise may be reduced, in some cases, thereby allowing for the signal that is readable from the HDD to be more pronounced.

The suppression of medium noise to a low level while maintaining resistance to heat and external magnetic fields in a magnetic recording medium for a high-density magnetic storage apparatus, such as a HDD, has been pursued in the field for some time. The CoCrPt alloy recording layer used in conventional media uses the phase separation of Co and Cr to segregate non-magnetic elements, such as Cr, at grain boundaries. A large quantity of the non-magnetic elements forming the grain boundary may be added in order to reduce medium noise. However, many of these elements are not completely segregated at the grain boundaries and often remain in the crystal grains. Thus, the magnetic anisotropic energy decreases, and maintaining the signal quality is difficult. In contrast, because oxides and magnetic crystal grains are easily separated in a granular recording layer, the medium noise may be reduced while maintaining high magnetic anisotropic energy without needing to add a large quantity of nonmagnetic elements such as Cr. For example, medium performance may be improved by improving the recording layer, as described in Japanese Unexamined Patent Application Publication No. 2003-178413 and United States Patent Application Publication No. 2006/0121319.

Even in media using this kind of granular recording layer, the crystal grains and the recording magnetization unit (magnetic cluster size) of the recording layer may be finer, e.g., smaller in size, which will further reduce medium noise. The crystal grain diameter and the magnetic cluster size of the recording layer depend strongly on the seed layer and the intermediate layer used in constructing the magnetic media.

In particular, to obtain a steep recording magnetic field gradient as the distance decreases between the magnetic head and the soft-magnetic underlayer, it is useful to improve the crystal orientation of the recording layer in a thin intermediate layer and further miniaturize the crystal grains and the magnetic cluster size. For example, United States Patent Application Publication No. 2005/0202286, Japanese Patent No. 4,019,703, Japanese Unexamined Patent Application Publication No. 2002-334424, U.S. Pat. No. 7,641,989, United States Patent Application Publication No. 2009/0195924 and United States Patent Application Publication No. 2009/0116137 disclose methods for adding metal elements to an Ru intermediate layer and a granular intermediate layer with oxides added to the intermediate layer. However, although obtaining a constant effect was confirmed in these references, this effect was inadequate to realize a higher areal recording density.

Therefore, a magnetic recording medium that is capable of high recording density with low medium noise by reducing the magnetic cluster size without increasing the amount of oxide in the recording layer would be beneficial to the field of magnetic data reproduction.

SUMMARY OF THE INVENTION

In one embodiment, a perpendicular magnetic recording medium includes a substrate, a soft-magnetic underlayer above the substrate, a seed layer above the soft-magnetic underlayer, a first intermediate layer above the seed layer, a second intermediate layer above the first intermediate layer, a recording layer above the second intermediate layer, and a protective layer above the recording layer. The second intermediate layer includes an Ru alloy having an element selected from a group consisting of: Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, and Si in a range about 20 at. % to about 40 at. %.

In another embodiment, a perpendicular magnetic recording medium includes an adhesion layer above a substrate, the adhesion layer having a thickness in a range from about 2 nm to about 40 nm, a soft-magnetic underlayer above the adhesion layer, wherein a thickness of the soft-magnetic underlayer is in a range from about 20 nm to about 100 nm, a seed layer above the soft-magnetic underlayer, a first intermediate layer above the seed layer, the first intermediate layer having a hexagonal close packed (hcp) structure and including Ru or an Ru alloy having at least one element selected from a group consisting of Cr, Ta, W, Mo, Nb, and Co, wherein a thickness of the first intermediate layer is in a range from about 8 nm to about 20 nm, a second intermediate layer above the first intermediate layer, the second intermediate layer including an Ru alloy not having a hexagonal close packed (hcp) structure, including an element selected from a group consisting of: Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, and Si in a range from about 20 at. % to about 40 at. %, wherein a thickness of the second intermediate layer is in a range from about 0.5 nm to about 2 nm, a recording layer above the second intermediate layer, the recording layer including crystal grains of at least one of Co and Pt doped with at least one of Cr, Ti, Ta, Ru, W, Mo, Cu, and B, the crystal grains being surrounded by at least one oxide, the oxide including any of Si, Ti, Ta, B, Cr, Mo, W, and Nb, wherein the recording layer includes a plurality of layers, and wherein a concentration of the crystal grains of at least one of Co and Pt are varied across the plurality of layers, and a protective layer above the recording layer, the protective layer including diamond like carbon having a thickness in a range from about 2 nm to about 5 nm.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 11 shows a table which shows the magnetic characteristic (coercive force 11c), magnetic cluster size (Dn), and mean grain diameter (d) of the recording layer observed by a transmission electron microscope of several examples and comparative examples.

FIG. 12 shows a table which shows the magnetic characteristics and the magnetic cluster size of several examples and comparative examples.

FIG. 13 shows a table which lists the magnetic characteristic (coercive force Hc), magnetic cluster size (Dn), and the mean grain diameter (d) of the recording layer observed by a transmission electron microscope of several examples and comparative examples.

FIG. 14 shows a table which lists the crystal orientation characteristic ($\Delta\theta_{50}$) and the recording and playback characteristics of the recording layer when the Ti concentration of the second intermediate layer was changed of several examples and comparative examples.

FIG. 15 shows a table which lists the amount of oxygen added when the second intermediate layer was formed, the magnetic characteristic (coercive force Hc), and the medium SNR of several examples and comparative examples.

FIG. 16 shows a table which shows the (0004) peak intensity and the diffraction angle 2θ of Ru in the second intermediate layer measured by X-ray diffraction for one sample.

FIG. 17 shows a table which lists the magnetic characteristic (coercive force Hc), crystal orientation ($\Delta\theta_{50}$), and medium SNR of several examples and comparative examples.

FIG. 18 shows a table which lists the magnetic characteristic, (coercive force HO, crystal orientation ($\Delta\theta_{50}$), and medium SNR of several examples and comparative examples.

FIG. 19 shows a table which shows the results of the recording and playback characteristics of several examples and comparative examples.

FIG. 20 shows a table which lists the characteristic (coercive results of the magnetic force Hc) and recording and playback characteristics of several examples and comparative examples.

DETAILED DESCRIPTION

Figure 1:
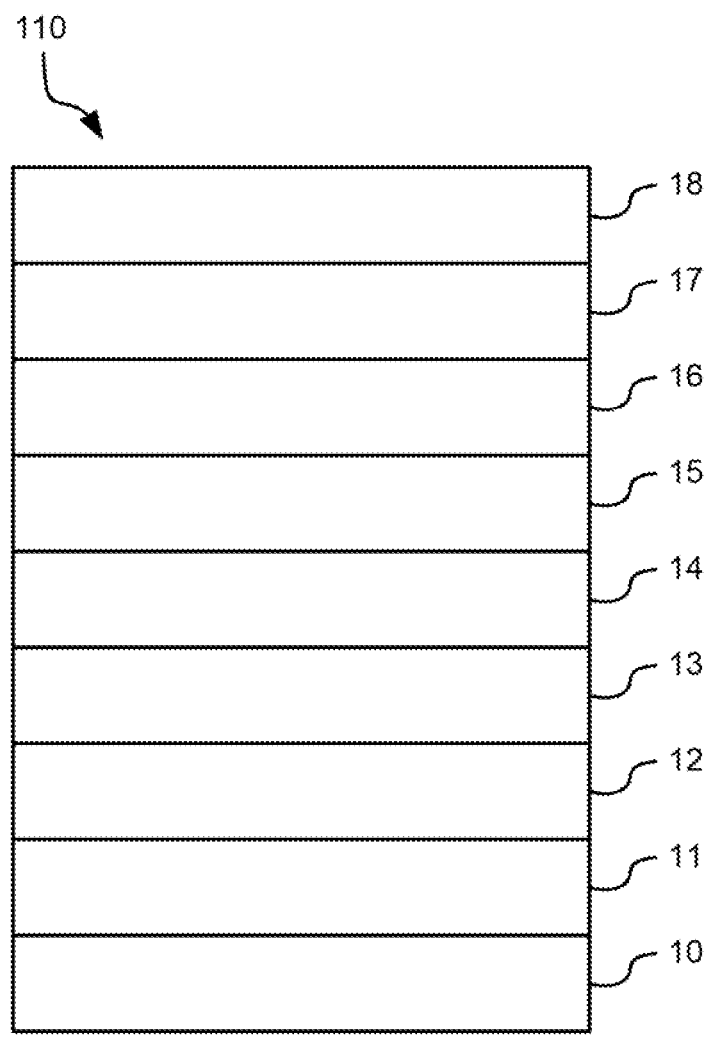
FIG. 1 is a cross-sectional schematic diagram showing the structure of a perpendicular magnetic recording medium, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a perpendicular magnetic recording medium includes a substrate, a soft-magnetic underlayer above the substrate, a seed layer above the soft-magnetic underlayer, a first intermediate layer above the seed layer, a second intermediate layer above the first intermediate layer, a recording layer above the second intermediate layer, and a protective layer above the recording layer. The second intermediate layer includes an Ru alloy having an element selected from a group consisting of Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, and Si in a range about 20 at. % to about 40 at. %.

In another general embodiment, a perpendicular magnetic recording medium includes an adhesion layer above a substrate, the adhesion layer having a thickness in a range from about 2 nm to about 40 nm, a soft-magnetic underlayer above the adhesion layer, wherein a thickness of the soft-magnetic underlayer is in a range from about 20 nm to about 100 nm, a seed layer above the soft-magnetic underlayer, a first intermediate layer above the seed layer, the first intermediate layer having a hexagonal close packed (hcp) structure and including Ru or an Ru alloy having at least one element selected from a group consisting of: Cr, Ta, W, Mo, Nb, and Co, wherein a thickness of the first intermediate layer is in a range from about 8 nm to about 20 nm, a second intermediate layer above the first intermediate layer, the second intermediate layer including an Ru alloy not having a hexagonal close packed (hcp) structure, including an element selected from a group consisting of: Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, and Si in a range from about 20 at. % to about 40 at. %, wherein a thickness of the second intermediate layer is in a range from about 0.5 nm to about 2 nm, a recording layer above the second intermediate layer, the recording layer including crystal grains of at least one of Co and Pt doped with at least one of: Cr, Ti, Ta, Ru, W, Mo, Cu, and B, the crystal grains being surrounded by at least one oxide, the oxide including any of Si, Ti, Ta, B, Cr, Mo, W, and Nb, wherein the recording layer includes a plurality of layers, and wherein a concentration of the crystal grains of at least one of Co and Pt are varied across the plurality of layers, and a protective layer above the recording layer, the protective layer including diamond like carbon having a thickness in a range from about 2 nm to about 5 nm.

To further improve the recording density in the granular recording layer of a magnetic recording medium, several refinements may be made: the crystal grain diameter of the recording layer may be smaller; the magnetic separation of the crystal grains may be promoted; and/or the magnetic cluster size, which is the reversal unit of magnetization, may be reduced, according to several embodiments. By producing a thinner seed layer and a thinner intermediate layer, the crystal grain diameter may become smaller. In addition, the grain diameter may be reduced even when metal elements are added to the Ru intermediate layer. However, even for small crystal grains, magnetic separation becomes inadequate, the magnetic cluster size increases, and noise cannot be reduced. With smaller crystal grain diameters, a large quantity of oxides may be added to ensure a constant grain boundary width, but the excess addition of oxides creates sub-grains, and the magnetic and recording characteristics degrade.

Therefore, to overcome these deficiencies, a perpendicular magnetic recording medium is described below according to various embodiments.

FIG. 1 shows a cross-sectional view of a perpendicular magnetic recording medium 110, according to one embodiment. The perpendicular magnetic recording medium 110 comprises several layers sequentially formed on a substrate 10, including an adhesion layer 11, a soft-magnetic underlayer 12, a seed layer 13, a first intermediate layer 14, a second intermediate layer 15, a recording layer 16, and a protective layer 17, followed by a fluid lubrication layer 18 on top, possibly formed after the magnetic medium is transported to a facility for installation thereof into a magnetic disk drive.

Various substrate 10 materials are possible, such as glass substrates, aluminum alloy substrates, plastic substrates, silicon substrates, etc., according to various embodiments.

The adhesion layer 11, with a film thickness of 20 nm comprising an NiTa alloy was formed on substrate 10 to increase adhesion to the substrate 10. Ni-37.5 at. % Ta was used as the NiTa alloy. However, any Ni alloy, Co alloy, Al alloy, etc., may also be used, along with alloys thereof. In addition, an adhesion layer 11 having a plurality of layers, comprising one or more of the previously mentioned materials, may also be used, in various embodiments. For example, an AlTi alloy, a NiAl alloy, a CoTi alloy, an AlTa alloy, etc., may be used. Although the adhesion layer 11 is not necessarily required, the adhesion layer 11 with a film thickness ranging from about 2 nm to about 40 nm can improve adhesion to the substrate 10.

The soft-magnetic underlayer 12 has the roles of suppressing the spread of the magnetic field generated by the magnetic head and efficiently magnetizing the recording layer 16, according to several embodiments. Alloys such as FeCoTaZr, FeCoTaZrCr, CoTaZr, CoTaZrCr, FeCoB, FeCoCrB, CoNbZr, and CoTaNb alloy may be used as the material for the soft magnetic underlayer. The soft magnetic underlayer may have a 3-layer structure in which a soft magnetic alloy is laminated with thin layers of Ru, enabling control of the recording width and recording performance by controlling coupling between the soft magnetic layers, using the film thickness of Ru. Moreover, it is also possible to employ a structure with a domain control layer provided for fixing the domain of the soft magnetic underlayer, the domain control layer being positioned below the soft magnetic underlayer and comprising a soft magnetic material such as FeCoTaZr or the like, or a structure in which a domain control layer is positioned below a structure which is antiferromagnetically coupled (AFC structure) to the soft magnetic alloy via a thin layer of Ru. among other possible structures.

In addition, an alloy having a face-centered cubic (fcc) structure may be used in a top portion of the soft-magnetic underlayer 12, in one approach. This fcc structure may be formed to control a crystal orientation of the seed layer 13 formed above the soft magnetic underlayer 12. Specifically, a material such as Ta, Nb, W, B, and/or V may be added to CoFe to form a fcc structure. In a preferred embodiment, a film thickness of the fcc portion of the soft-magnetic underlayer 12 may be in a range from about 1 nm to about 10 nm, such as 5 nm.

The seed layer 13 aids in controlling a crystal orientation and a grain diameter in the first intermediate layer 14, in some approaches. A metal having a fcc structure and/or including an amorphous material may be used for the seed layer 13. Specifically, a material such as Ni, Cu, Pd, Pt, etc., may be used since they have the fcc structure, and good crystal orientation may be obtained by adding at least one element selected from Cr, W, V, Mo, Ta, Nb, among others, in various embodiments.

In addition, in one embodiment, a magnetic material having a fcc structure may have a similar effect as having the soft-magnetic underlayer 12, and therefore a distance between the magnetic head and the soft magnetic layer may be reduced. Specifically, no more than about 10 at. % of Ta, W, Nb, Cr, B may preferably be added to NiFe or CoFe, which forms a fcc structure for use as the seed layer 13. A film thickness of the seed layer 13 may differ depending on material and film thickness of the intermediate layer 14 and the recording layer 16, and the combination with the recording and playback head, but may preferably be in a range from about 2 nm to about 10 nm, such as about 5 nm. A thickness of less than about 2 nm is not preferred because the crystal orientation may degrade at these thicknesses. A thickness more than about 10 nm is also not preferred because the crystal grain diameter of the recording layer may increase at these thicknesses. Furthermore, when a small crystal grain diameter of the recording layer 16 is desired, an amorphous material may be used for the seed layer 13. Specifically, when a film thickness is in a range from about 1 nm to about 4 nm, and the seed layer comprises Ta, TiAl, CrTi, NiTa, etc., good crystal orientation may be obtained.

A first intermediate layer 14 is formed that, in some embodiments, may improve the crystal orientation of the recording layer 16 and further promote magnetic separation. Specifically, Ru or Ru alloy having a hexagonal close packed (hcp) structure may be used, including an element selected from Cr, Ta, W, Mo, Nb, Co, among others, added to the Ru or Ru alloy, in some approaches. Both the crystal orientation and magnetic separation may be established by stepwise changing of the deposition conditions and the materials during formation of the layer, in one approach.

In one approach, a method may be used to form the first intermediate layer 14 where a low gas pressure is used to improve crystal orientation when film deposition starts, and the gas pressure is increased to aid in magnetic separation immediately before film deposition ends. Accordingly, a two-stage structure, a three-stage, or more stage structure may be formed under conditions having different gas pressures and materials, according to various embodiments. In one approach, low gas pressure may be less than about 1 Pa.

In another approach, high gas pressure may be in a range from about 2 Pa to about 6 Pa. In this range, the surface roughness of Ru increases, and the isolation of Ru grains are promoted. In a preferred embodiment, the film thickness of the first intermediate layer 14 may be in a range from about 8 nm to about 20 nm, such as about 12 nm. If the thickness is less than about 8 nm, the crystal orientation may degrade, in some approaches. If the thickness is greater than about 20 nm, an erased band width became large, and high-density recording may become difficult because the distance between the magnetic head and the soft-magnetic layer widens.

A second intermediate layer 15 is formed above the first intermediate layer 14, the second intermediate layer 15, in some approaches, being for promoting the magnetic separation of the recording layer 16. Specifically, it was discovered that although Ru is a main component of the second intermediate layer 15, it is advantageous for an Ru alloy to be in a composition that does not become a hcp structure. If the second intermediate layer 15 comprises an RuTi alloy, then Ru and at least about 20 at. % to no more than about 50 at. % Ti may be used, in one embodiment. If the second intermediate layer 15 comprises an RuNb alloy, Ru and at least about 20 at. % to no more than about 50 at. % Nb may be used, in one embodiment. If the second intermediate layer 15 comprises an RuAl alloy, Ru and at least about 20 at. % to no more than about 40 at. % Al may be used, in one embodiment. If the second intermediate layer 15 comprises an RuTa alloy, Ru and at least about 30 at. % to no more than about 50 at. % Ta may be used. If the second intermediate layer 15 comprises an RuSi alloy, Ru and at least about 20 at. % to no more than about 40 at. % Si may be used, in one approach.

These concentration ranges for the additive are ranges in which an Ru alloy does not become a hcp structure according to a two-dimensional phase diagram of Ru and each element. Other ranges may be used; however, there is a risk that a hcp structure may form, which is not preferred. If the concentration is lower than these ranges, an effect of promoting the magnetic separation may diminish, which is not desired. Conversely, if the concentrations are higher than these ranges, too many small grains may be generated in the recording layer 16, resulting in thermal instability even though magnetic separation may be promoted.

In addition, these elements may be mixed as one of skill in the art would understand upon reading the present descriptions, and in these embodiments, the Ru concentration may be at least about 50 at. % to no more than about 80 at. %.

In some embodiments, when a portion of the added elements is an oxide, it was discovered that the magnetic separation of the recording layer 16 may be further promoted. In this case, in a preferred embodiment, the oxide concentration may be less than about half or no more than about 40 vol. % of the total of the added elements in order to suppress degradation of the crystal orientation and the grain diameter variance of the recording layer. In a preferred embodiment, a film thickness of the second intermediate layer 15 may be in a range from about 0.5 nm to about 2 nm. Other thicknesses may be used, but are not preferred. If the thickness of the second intermediate layer 15 is less than about 0.5 nm, an effect of promoting magnetic separation of the magnetic crystal grains may not obtained, in some approaches. If the thickness is greater than about 2 nm, the crystal orientation may degrade, in some approaches.

In general, a recording layer comprising a CoCr alloy, which has a hcp structure, may be grown epitaxially on a conventional Ru intermediate layer and a conventional granular intermediate layer of Ru with added oxides having a hcp structure. In this case, there is lattice mismatch between the Ru and CoCr alloy. Deformation is produced at the boundary surface of the intermediate layer and the recording layer. In practice, when a sample formed up to the Ru intermediate layer and a sample formed up to the recording layer are evaluated by X-ray diffraction, the (0004) diffraction peaks of Ru are observed at different angles. This type of phenomenon is believed to occur because of the effect of the deformation in the boundary surface of the granular recording layer and the Ru intermediate layer. When a sample using a second intermediate layer as described above which does not become a hcp structure is compared to a sample having a second intermediate layer with a hcp structure of, for example, Ru, the full width at half maximum of the diffraction profile of the first intermediate layer becomes narrow when the second intermediate layer as described above is used, and the diffraction peak position of the recording layer differs slightly from that obtained with a conventional hcp second intermediate layer. By using the second intermediate layer as described above, the strain at the boundary surface of the intermediate layer and the recording layer may be relaxed, which is a desirable effect.

In a preferred embodiment, the recording layer 16 may use a granular recording layer comprising crystal grains having ferromagnetic properties that are surrounded by oxides. In several approaches, components of the ferromagnetic crystal grains may include Co and Pt, and additives to Co and Pt may include Cr, Ti, Ta, Ru, W, Mo, Cu, B, among others. In the non-magnetic grain boundaries, in a preferred embodiment, at least one oxide selected from Si, Ti, Ta, B, Cr, Mo, W, Nb may be present. The granular recording layer may form a plurality of layers, in one embodiment.

The overwrite characteristics may be improved while maintaining low noise property by forming the plurality of layers by varying the Pt concentration, the concentrations of other added elements, and/or the oxide concentration, in various embodiments. In addition, in a preferred embodiment, better overwrite characteristics may be obtained by layering a recording layer having a non-granular structure on the granular recording layer. In a preferred embodiment, a non-granular layer comprises a CoCrPt alloy including at least one element selected from B, Ta, Ru, Ti, W, Mo, Nb. The respective composition and the film thickness may be adjusted to match a film thickness of the soft-magnetic underlayer 12 and the performance of the magnetic head. There are no particular limits if the thermal demagnetization characteristic can be maintained in the range.

In a preferred embodiment, the protective layer 17 may be a film formed with carbon as a main component having a thickness from about 2 nm to about 5 nm. In another preferred embodiment, a fluid lubrication layer 18 may be a lubrication layer of, for example, perfluoroalkyl polyether. Of course, any lubricant as known in the art may be used.

According to embodiments of the present invention, since the signal-to-noise ratio (SNR) of the perpendicular magnetic recording medium can be improved, a perpendicular magnetic recording medium having high reliability and capable of high-density recording and enduring long-term use may be provided. By using this type of perpendicular magnetic recording medium, a compact, large-capacity magnetic storage apparatus may be provided, according to various embodiments.

EXAMPLE 1

FIG. 1 is a schematic view of a cross-section of a perpendicular magnetic recording medium, according to one embodiment. The perpendicular magnetic recording medium in this example was fabricated by using a sputtering apparatus. After the entire chamber was exhausted to a degree of vacuum below $2 \times 10^{-5}$ Pa, a carrier loaded with the substrate was moved to each process chamber, and a sequential process was executed.

The adhesion layer 11, the soft-magnetic underlayer 12, the seed layer 13, the first intermediate layer 14, the second intermediate layer 15, and the recording layer 16 were successively formed on the substrate 10 by DC magnetron sputtering, and diamond-like carbon (DLC) was formed as the protective layer 17. Finally, a lubrication agent of a perfluoroalkyl polyether material diluted by fluorocarbons was coated above the structure. A glass substrate having a 65 mm diameter and 0.8 mm thickness was used as the substrate 10. Adhesion layer 11, with a film thickness of 20 nm comprising a NiTa alloy, was formed on substrate 10 under 0.7 Pa Ar gas pressure to increase adhesion to the substrate 10. Ni-37.5 at. % Ta was used as the NiTa alloy. Soft magnetic underlayer 12 was then made in a laminated 3-layer structure of FeCoTaZr alloy with thin layers of Ru interposed under 0.7 Pa Ar gas pressure. 51 at. % Fe-34 at. % Co-10 at. % Ta-5 at. % Zr was used as the FeCoTaZr alloy. The film thickness of the FeCoTaZr alloy was 20 nm per layer, and the thickness of the Ru layer was 0.4 nm. Above that, a 7 nm thick Ni-10 at. % Cr-6 at. % W film was formed as the seed layer 13. The first intermediate layer 14 was formed from 5 nm thick Ru formed under 0.6 Pa Ar gas pressure, 5 nm thick Ru formed under 2 Pa Ar gas pressure, and 5 nm thick Ru formed under 4.6 Pa Ar gas pressure. An Ru—Ti target was used to form the second intermediate layer 15 as a 1 nm thick film, while varying the mixture ratio of Ar to oxygen under 4 Pa total gas pressure. A target of Co-10 at. % Cr-20 at. % Pt alloy with 5 mol % $SiO_2$ and 5 mol % $TiO_2$ added and a gas of 0.5% oxygen mixed in Ar gas were used to form the 13 nm recording layer 16 under 5 Pa pressure, and 3 nm thick DLC film was formed as the protective layer 17. Finally, a lubrication agent of a perfluoroalkyl polyether material diluted by fluorocarbons was coated as the fluid lubrication layer 18.

To form the second intermediate layer 15, Ru, Ru-10 at. % Ti alloy, Ru-20 at. % Ti alloy, Ru-30 at. % Ti alloy, Ru-40 at. % Ti alloy, Ru-50 at. % Ti alloy, Ru-60 at. % Ti alloy were used. The media were fabricated when the amount of oxygen added during sputtering was adjusted in order to maximize the coercive force for the respective alloy, and when no oxygen was added during sputtering.

A Kerr effect magnetometer was used to evaluate the magnetic characteristics of the media. While a magnetic field was applied in a direction perpendicular to the film surface of the sample, the Kerr rotational angle was detected and the Kerr loop was measured. The sweep of the magnetic field was a constant velocity, from +2000 kA/m to −2000 kA/m, then from −2000 kA/m to +2000 kA/m in a span of 30 seconds.

The magnetic cluster size of the recording layer was determined by analyzing the minor loops measured by a polar kerr magnetometer. For example, detail procedures of this method were disclosed in "Designing magnetic of capped perpendicular media with minor-loop analysis", J. MMM, 320 (2008) 3144-3150. The saturated magnetization (Ms) value measured by using the vibrating sample magnetometer (VSM) was used to correct the absolute value of the magnetization. The crystal orientation ($\Delta\theta_{50}$) of the medium was determined from the rocking curves. This method initially determines the (0004) diffraction peak position $2\theta$ parallel to the film surface of the recording layer by the $\theta$-$2\theta$ scanning method and then $\theta$ scans with the diffraction angle fixed at $2\theta$.

Figure 2:
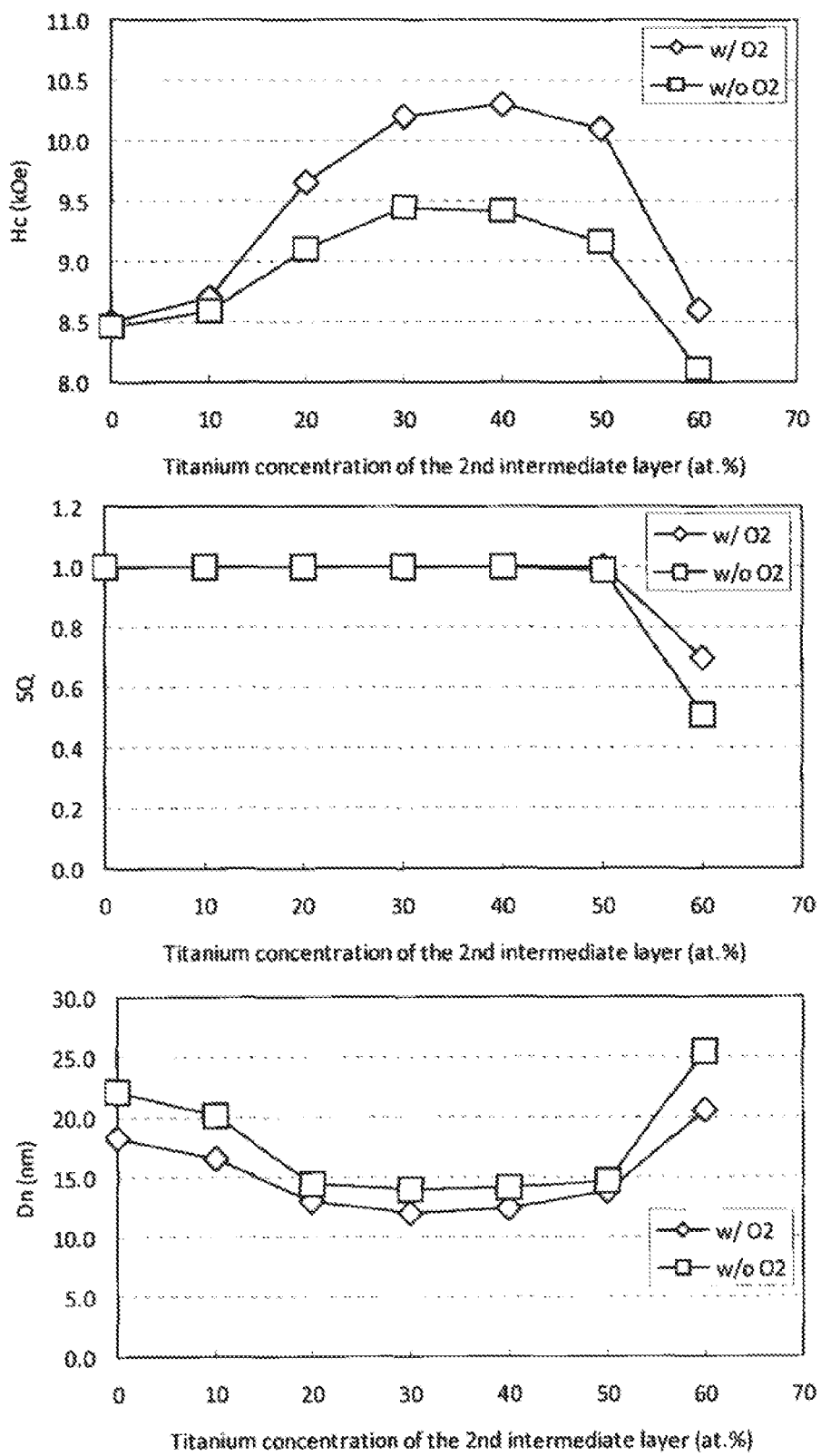
FIG. 2 shows relationships between Ti concentration, magnetic characteristics, and magnetic cluster size of the media with various second intermediate layers, according to one embodiment.

FIG. 2 shows magnetic characteristics (coercive force Hc, squareness SQ) and the magnetic cluster size (Dn) when the Ti concentration was varied in the second intermediate layer 15. The media were fabricated when the amount of oxygen added during sputtering was adjusted to maximize the coercive force at each concentration, and when no oxygen was added during sputtering.

The coercive force Hc becomes larger in the Ti concentration range from 20 at. % to 50 at. %, and a larger coercive force is obtained when oxygen is added. The squareness SQ does not depend on the added oxygen and degrades when the Ti concentration exceeds 50 at. %. The magnetic cluster size Dn decreases in the Ti concentration range from 20 at. % to 50 at. % and decreases further when oxygen is added. Thus, it was found that the intergranular exchange coupling in the recording layer can be reduced in the Ti concentration range from 20 at. % to 50 at. %, and the magnetic cluster size can be reduced while high coercive force and squareness are maintained. It was also found that a large coercive force and a small magnetic cluster size are obtained by adding oxygen.

Media having the above structure were fabricated with the second intermediate layer 15 comprising an Ru—Al alloy and an Ru—Si alloy while varying the added concentration. The media were fabricated when the amount of oxygen added during sputtering was adjusted so that the coercive force became the maximum at each concentration, and when no oxygen was added during sputtering.

Figure 3:
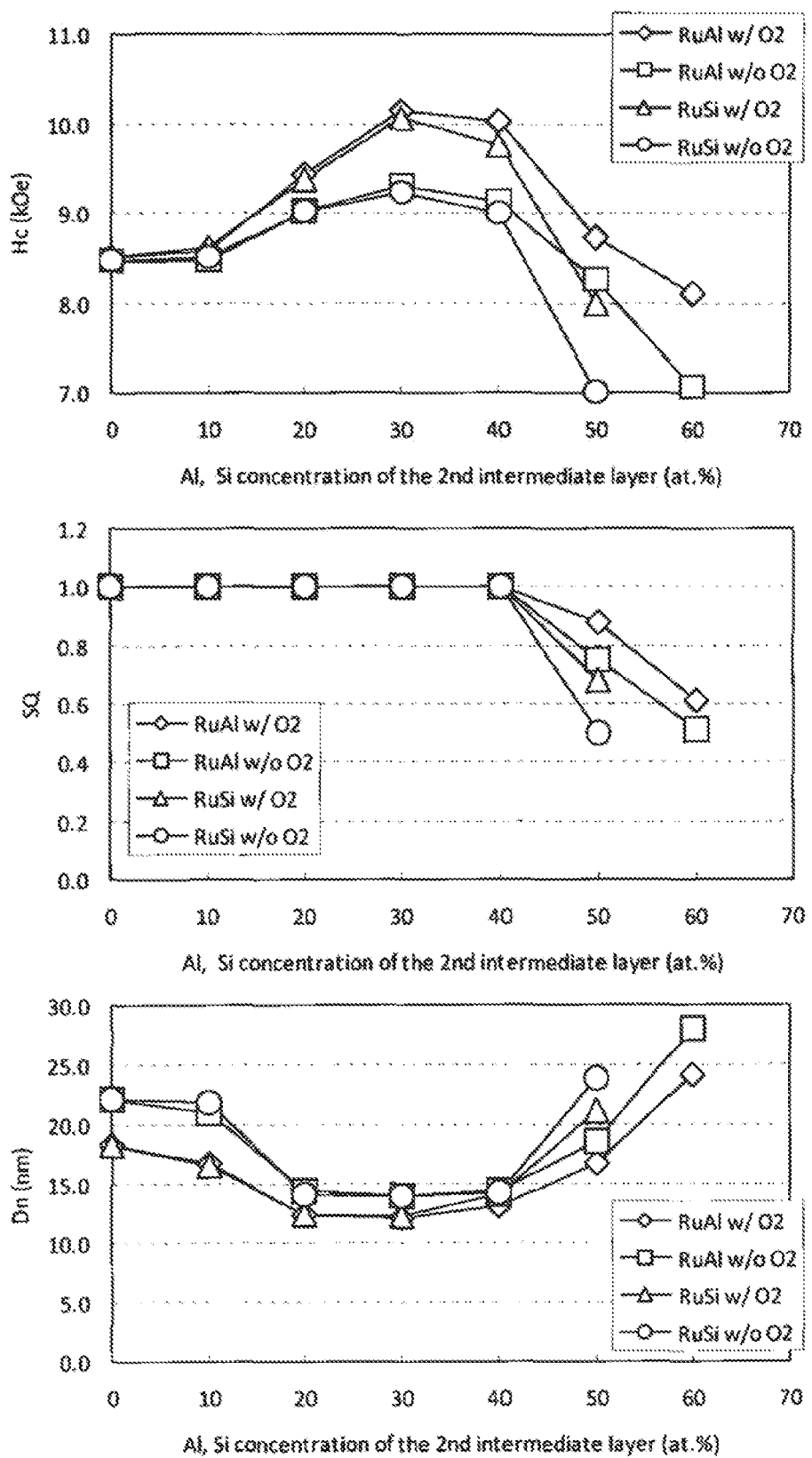
FIG. 3 shows relationships between Al concentration, Si concentration, magnetic characteristics, and magnetic cluster size of the media with various second intermediate layers, according to one embodiment.

FIG. 3 shows the magnetic characteristics and the magnetic cluster size. The coercive force He becomes larger when the concentration range was from 20 at. % to 40 at. % for both Ru—Al and Ru—Si. A larger coercive force is obtained when more oxygen is added. The squareness SQ does not depend on the added oxygen and degrades when the added concentration exceeds 40 at. %. The magnetic cluster size Dn decreases in the added concentration range from 20 at. % to 40 at. % and decreases further when oxygen is added. Therefore, the magnetic cluster size can be reduced while maintaining a high coercive force and squareness by adding Al or Si in the range from 20 at. % to 40 at. % to Ru. Furthermore, a large coercive force and a small magnetic cluster size can be obtained by similarly adding oxygen to Ru—Ti alloy.

Figure 4:
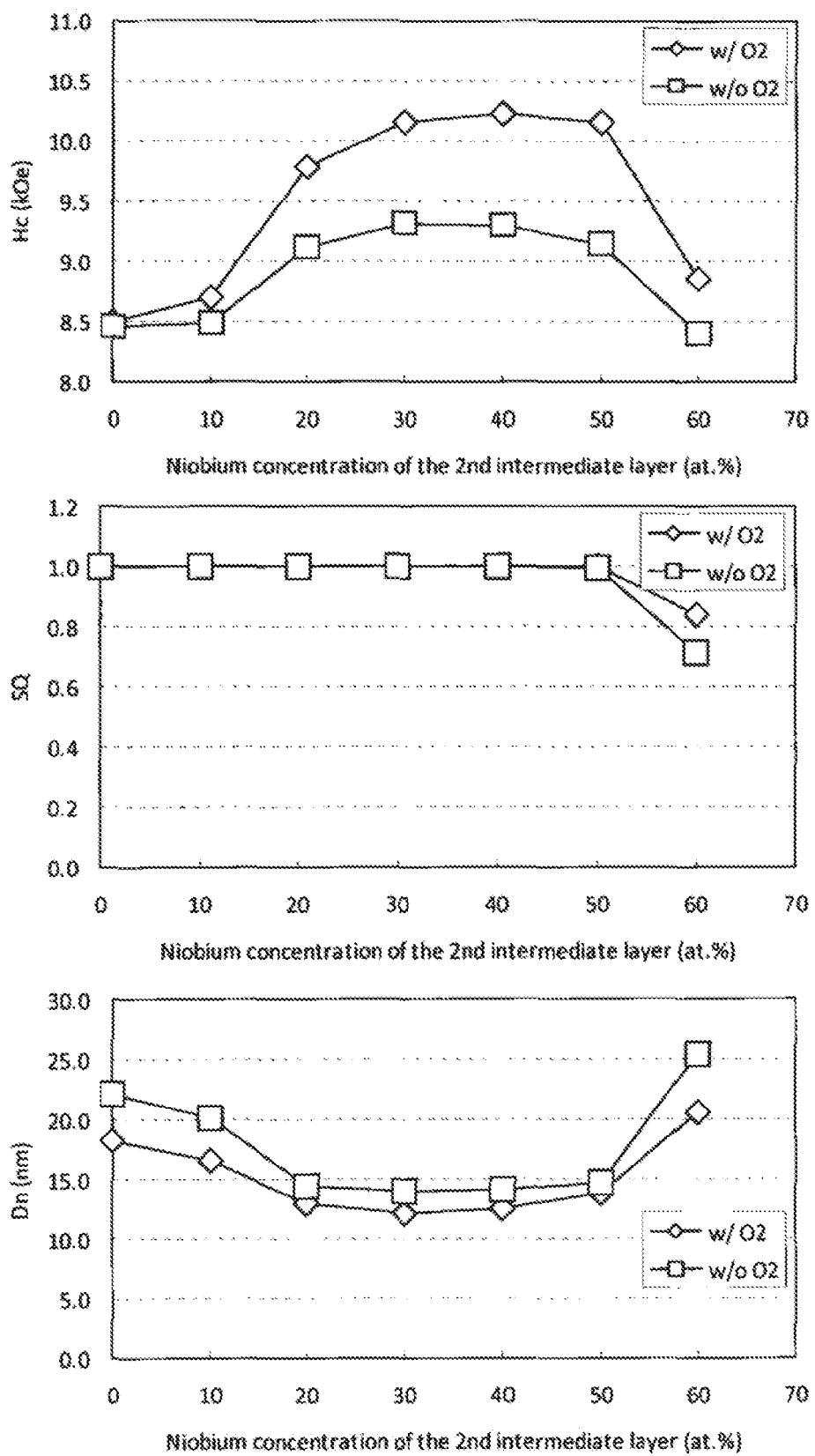
FIG. 4 shows relationships between Nb concentration, magnetic characteristics, and magnetic cluster size of the media with various second intermediate layers, according to one embodiment.

Media having the above structure were fabricated with the second intermediate layer 15 of Ru—Nb alloy while varying the added concentration. The media were fabricated when the amount of oxygen added during sputtering was adjusted in order to maximize the coercive force at each concentration and when no oxygen was added during sputtering. FIG. 4 shows the magnetic characteristics and the magnetic cluster size. The coercive force Hc increases in the Nb concentration range from 20 at. % to 50 at. %, and a larger coercive force is obtained when oxygen is added. The squareness SQ does not depend on the added oxygen and degrades when the added concentration exceeds 50 at. %. The magnetic cluster size Dn decreases in the Nb concentration range from 20 at. % to 50 at. % and decreases further when oxygen is added. Thus, it was found that the magnetic cluster size can be decreased while maintaining the high coercive force and squareness in the Nb concentration range from 20 at. % to 50 at. %. A large coercive force and a small magnetic cluster size are obtained by adding more oxygen.

Figure 5:
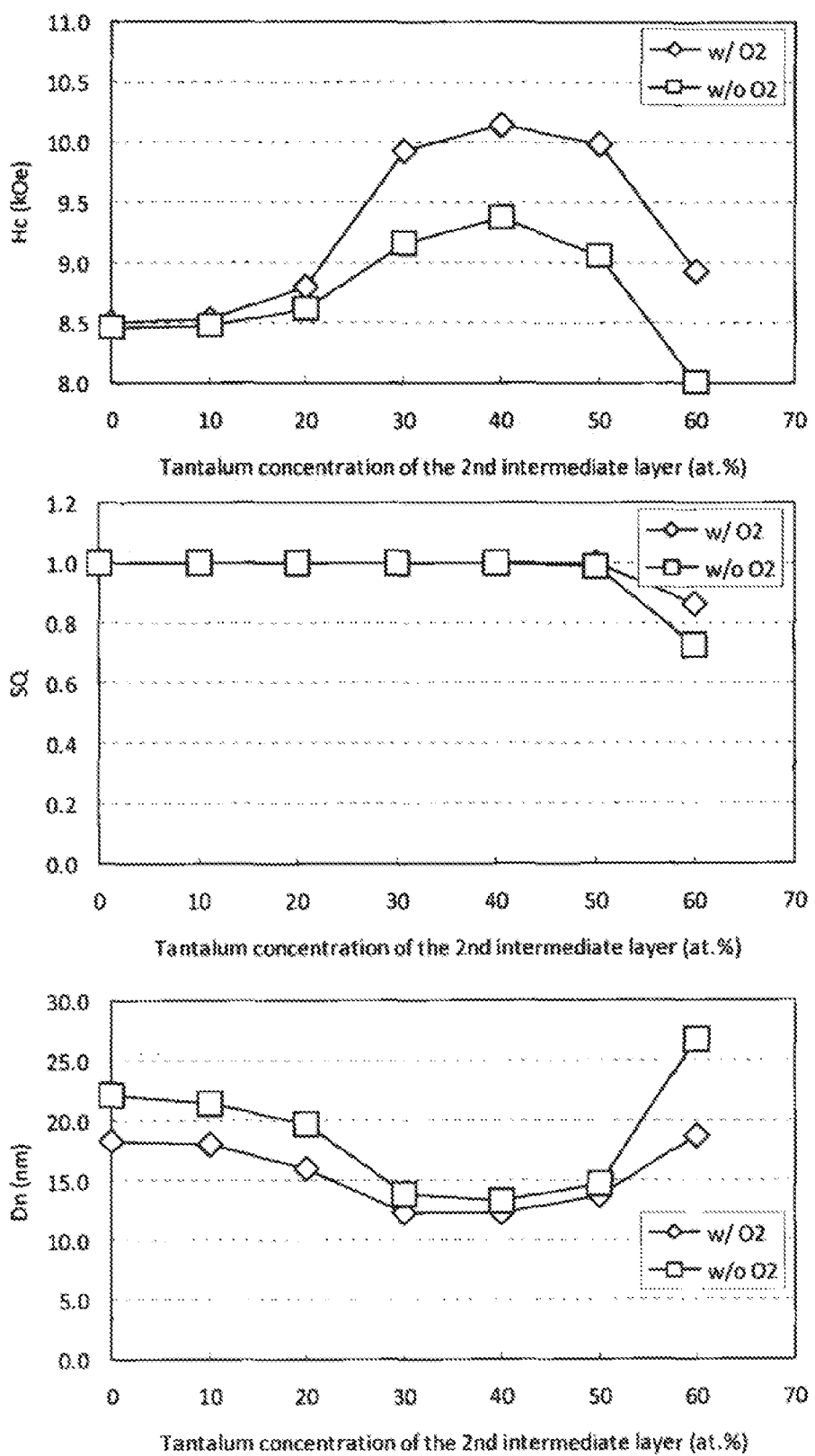
FIG. 5 shows relationships between Ta concentration, magnetic characteristics, and magnetic cluster size of the media with various second intermediate layers, according to one embodiment.

Media having the above structure were fabricated with the second intermediate layer 15 of Ru—Ta alloy while varying the added concentration. The media were fabricated when the amount of oxygen added during sputtering was adjusted to maximize the coercive force at each concentration and when no oxygen was added during sputtering. FIG. 5 shows the magnetic characteristics and the magnetic cluster size. The coercive force Hc increases in the Ta concentration range from 30 at. % to 50 at. %, and a larger coercive force is obtained by adding oxygen. The squareness SQ does not depend on the amount of oxygen added and degrades when the added concentration exceeds 50 at. %. The magnetic cluster size Dn decreases in the Ta concentration range from 30 at. % to 50 at. % and decreases further when oxygen is added. Therefore, the magnetic cluster size can be decreased while maintaining the high coercive force and the squareness in the Ta concentration range from 30 at. % to 50 at. %. By adding more oxygen, a larger coercive force and a small magnetic cluster size can be obtained.

Media having the above structure were fabricated to have a second intermediate layer 15 of Ru-30 at. % Ti while the seed layer 13 was varied. The table in FIG. 11 shows the magnetic characteristic (coercive force Hc), magnetic cluster size (Dn), and mean grain diameter (d) of the recording layer observed by a transmission electron microscope. When compared for the same seed layer, the mean grain diameters of the recording layers were equal, but the media in this example obtained a high coercive force under any condition. In addition, all of the media in this example obtained a small magnetic cluster size. As shown in Comparative Examples 1-1 to 1-5, the magnetic separation became inadequate, and the magnetic cluster size increased as the crystal grain diameter became smaller in the second intermediate layer having the conventional composition. The intergranular exchange coupling of the crystal grains in the recording layer of an embodiment of the present invention can decrease without changing the mean grain diameter in the recording layer.

Media having the above structure were fabricated by changing the material of the second intermediate layer and adjusting the amount of oxygen added to maximize the coercive force for each condition. The table in FIG. 12 shows the magnetic characteristics and the magnetic cluster size. As shown in Examples 1-6 to 1-8, a large coercive force and a small magnetic cluster size were obtained even when the mixing ratio of Ti and Ta was varied. As shown in Examples 1-9 to 1-15, a large coercive force and a small magnetic cluster size were obtained by varying the combination of mixed material. In contrast, as shown in Comparative Examples 1-7 to 1-11, the effect of reducing the magnetic cluster size independent of the added concentrations was not present for Cr, W, and Mo. As shown in Comparative Examples 1-13 to 1-18, the effect of reducing the magnetic cluster size even when mixing an additional element in this type of combination was not present.

Media having the above structure were fabricated by varying the oxide concentration of the recording layer. The table in FIG. 13 lists the magnetic characteristic (coercive force $11c$), magnetic cluster size (Dn), and the mean grain diameter (d) of the recording layer observed by a transmission electron microscope. As shown in Examples 1-16 to 1-20, a high coercive force was obtained and a small magnetic cluster size can be realized even when a small amount of oxide is added to the recording layer by using the second intermediate layer of the present embodiment. As shown in Comparative Examples 1-19 to 1-23, the coercive force was lower and the magnetic cluster size increased in the media in the Examples even when the oxide concentration of the recording layer was lower in the conventional intermediate layer. When the same recording layers are compared in the media in the Examples and the Comparative Examples, the mean grain diameter and the grain boundary width are the same. A thicker grain boundary width was believed to be advantageous to reduce the intergranular exchange coupling in the granular recording layer. However, according to this result, in the case of the examples the grain boundary width is adequate even at approximately 0.5 nm because the magnetic separation in the initial growth layer is promoted by the second intermediate layer, in preferred embodiments.

EXAMPLE 2

Figure 6:
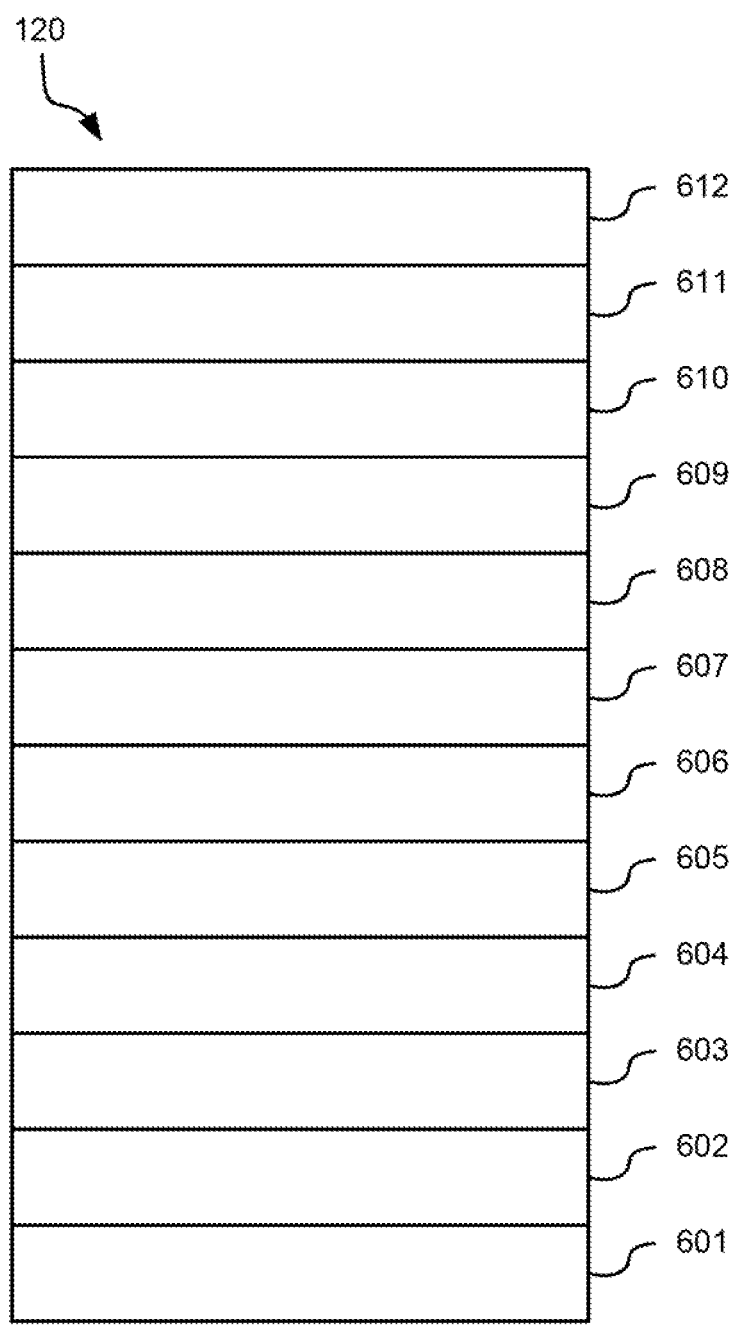
FIG. 6 is a cross-sectional schematic diagram showing the structure of a perpendicular magnetic recording medium, according to one embodiment.

FIG. 6 is a schematic drawing showing a cross section of a perpendicular magnetic recording medium 120, according to one embodiment. A glass substrate having a thickness of 0.8 mm and a diameter of 65 mm was used as a substrate 601. Adhesion layer 602, with a film thickness of 20 nm comprising a NiTa alloy, was formed on substrate 601 under 0.7 Pa Ar gas pressure to increase adhesion to the substrate 601. Ni-37.5 at. % Ta was used as the NiTa alloy. Soft magnetic underlayer 603 was then made in a laminated 3-layer structure of FeCoTaZr alloy with thin layers of Ru interposed under 0.7 Pa Ar gas pressure. 51 at. % Fe-34 at. % Co-10 at. % Ta-5 at. % Zr was used as the FeCoTaZr alloy. The film thickness of the FeCoTaZr alloy was 20 nm per layer, and the thickness of the Ru layer was 0.4 nm. Above that, 7 nm thick Ni-10 at. % Cr-8 at. % W film was formed as a seed layer 604. A first intermediate layer 605 was formed from 5 nm thick Ru formed under 0.6 Pa Ar gas pressure, 5 nm thick Ru formed on top under 2 Pa Ar gas pressure, and 5 nm thick Ru formed under 4.6 Pa Ar gas pressure. A second intermediate layer 606 was the film formed by using an Ru-30 at. % Ti alloy target under 2.6 Pa Ar gas pressure. A 4.4 nm first recording layer 607 was formed by using a target of Co-10 at. % Cr-20 at. % Pt alloy with 5 mol % $SiO_2$ and 5 mol % $TiO_2$ added, and a gas of 0.5% oxygen mixed in Ar gas under 3.5 Pa pressure. A 4 nm second recording layer 608 was formed by using a target of Co-26 at. % Cr-16 at. % Pt alloy with 6 mol % $SiO_2$ and 1.5 mol % $CO_3O_4$ added under 2.4 Pa Ar gas pressure. A 4.5 nm third recording layer 609 was formed by using a target of Co-26 at. % Cr-10 at. % Pt alloy with 4 mol % $SiO_2$ added under 1 Pa Ar gas pressure. A 3.5 nm fourth recording layer 610 was formed from Co-15 at. % Cr-14 at. % Pt-8 at. % B under a 0.6 Pa Ar gas pressure. A protective layer 611 was formed from a 2.9 nm thick DLC film. Finally, a lubricating agent of a perfluoroalkyl polyether material diluted by fluorocarbons was coated to form a lubrication layer 612.

The recording and playback characteristics of the media were evaluated by using a spin stand. In the evaluation, a magnetic head having a write element, which had a 60 nm track width, and a read element, which had a 55 nm track width and used the tunnel magnetoresistive effect, was used. The conditions were a rotation speed of 10 m/s, a skew angle of 0°, and a magnetic spacing of approximately 8 nm. The medium SNR was set as the ratio of the playback output when a 10,124 fr/mm signal was recorded to the integrated noise when a 70,867 fr/mm signal was recorded. The change of the playback output after 1000 seconds have elapsed after recording the 10,124 fr/mm signal was set as the index of the thermal demagnetization characteristic.

The table in FIG. 14 lists the crystal orientation characteristic ($\Delta\theta_{50}$) and the recording and playback characteristics of the recording layer when the Ti concentration of the second intermediate layer 606 was changed. All of the media in the examples (Examples 2-1 to 2-4) obtained good crystal orientation, medium SNR, and small signal decay. In contrast, as shown in Comparative Examples 2-1 and 2-2, when a conventional intermediate layer with a small added amount of oxide was used, the crystal orientation was good, but because the magnetic separation of the recording layer was inadequate, a high medium SNR could not be obtained. As shown in Comparative Example 2-3, when oxygen was added to a small amount of Ti, a high medium SNR could not be obtained. As shown in Comparative Examples 2-4 to 2-6, when a high concentration of oxide was added to Ru, the crystal orientation of the recording layer and the medium SNR degraded. In addition, as shown in Comparative Example 2-7, when the Ti concentration was set to 60 at. %, the large signal decay was conspicuous. This is believed to be the result of the generation of a large quantity of too small grains, resulting in the degradation of thermal stability.

Figure 7:
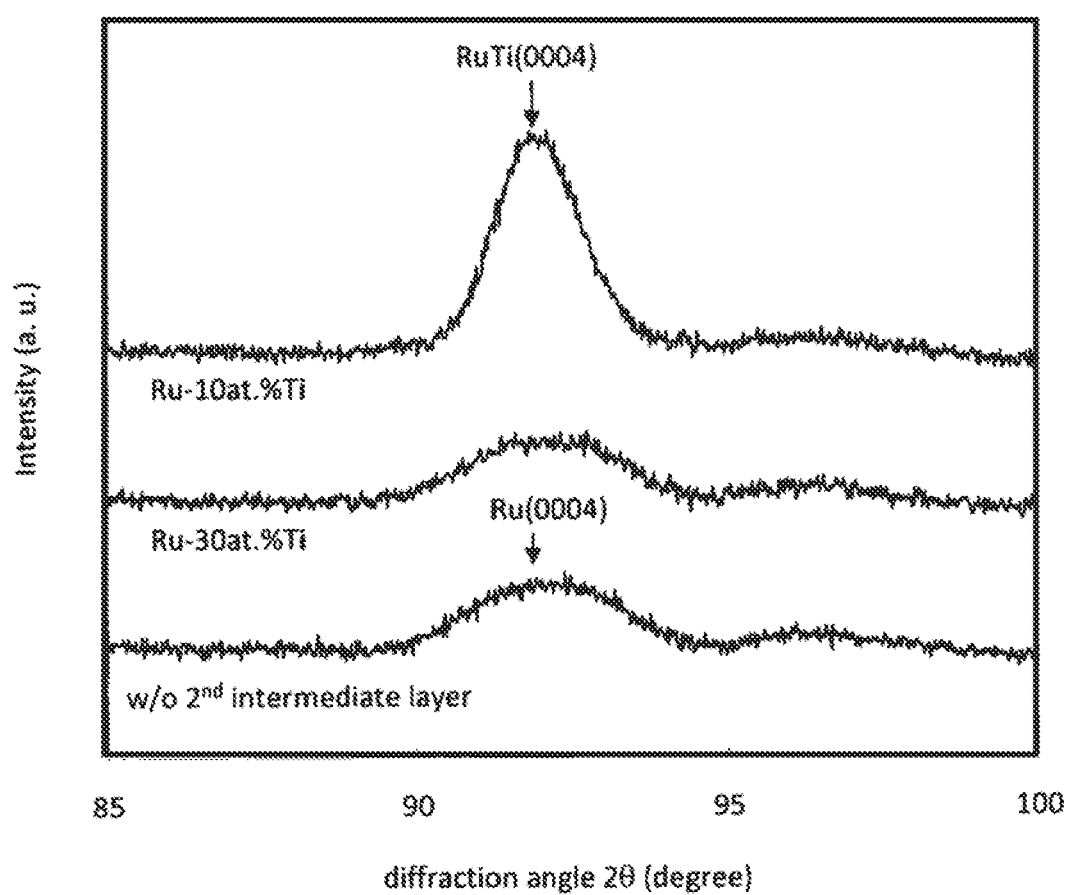
FIG. 7 shows the X-ray diffraction profile of the second intermediate layer, according to one embodiment.

Media having the above structure were fabricated with the second intermediate layer 606 of Ru-30 at. % Ti while varying the amount of oxygen added to the Ar gas during film deposition. The table in FIG. 15 lists the amount of oxygen added when the second intermediate layer was formed, the magnetic characteristic (coercive force Hc), and the medium SNR. All of the media in the Examples (Examples 2-5 to 2-9) obtained high coercive force Hc and good medium SNR. in particular, even in Example 2-5 that did not add oxygen, a better medium SNR than the Comparative Examples was obtained. As shown in Comparative Examples 2-8 to 2-12, high medium SNR was not obtained even when the amount of oxygen was varied at a Ti concentration of 10 at. %. The method described below was used to investigate what crystal structures would result in the second intermediate layers when the amount of oxygen was changed. A sample was fabricated in which the layers were formed in the same way until seed layer 604 of the structure described above; the 5 nm first intermediate layer 605 of Ru was formed under 1 Pa Ar gas pressure; the 8 nm second intermediate layer 606 was formed under the oxygen condition listed in the table in FIG. 15; and the protective layer 611 was formed without forming recording layer. The table in FIG. 16 shows the (0004) peak intensity and the diffraction angle 2θ of Ru in the second intermediate layer measured by X-ray diffraction for the sample. FIG. 7 shows the X-ray diffraction profiles of Ru-10 at. % Ti and Ru-30 at. % Ti without the added oxygen, and the sample formed without the second intermediate layer. For the samples having the conditions presented for this example, a diffraction peak could not be observed for the second intermediate layer, but only observed in the diffraction profile identical to the material without the second intermediate layer. According to the two dimensional state diagram of Ru and Ti, the Ti concentration solid dissolved in Ru is approximately 5 at. % at low temperatures and approximately 14 at. % at high temperatures. Ru-30 at. % Ti is in the range that does not produce a hcp structure. Because the peak could not be verified even by X-ray diffraction, the second intermediate layer is not believed to become a hcp structure. In contrast, in the conditions of the Comparative Examples, the structure was hcp because the strong diffraction peak of Ru-10 at. % Ti was observed. In addition, when the amount of oxygen added during film deposition increased from 0% to 6%, the diffraction angle of Ru-10 at. % Ti increased from 91.72° to 92.07°. As the amount of oxygen added increased, Ti was oxidized and segregated to the grain boundaries; the Ti concentration in the grain cores decreased; and the Ru lattice spacing decreased. All of the 10 at. % Ti is believed to become an oxide when 6% of oxygen is added because the diffraction angle of Ru-10 at. % Ti is identical to that of Ru. In addition, an equivalent amount of Ti in Ru-30 at. % Ti is considered to be oxidized when the same mount of oxygen is added. For oxygen added at 6%, approximately 10 at. % of Ti becomes an oxide. The remaining 20 at. % Ti may exist unchanged in the film as a metal.

Media having the above structure were fabricated with the second intermediate layer 606 from Ru-30 at. % Ti while the film thickness was varied. The table in FIG. 17 lists the magnetic characteristic (coercive force Hc), crystal orientation ($\Delta\theta_{50}$), and medium SNR. When the film thickness was in the range from 0.5 nm to 2 nm as in the media in the examples (Example 2-10 to 2-14), a high coercive force, good crystal orientation, and high medium SNR were obtained. As shown in Comparative Examples 2-13 and 2-14, when the film thickness was thinner than 0.5 nm, the coercive force was low, and the medium SNR decreased. As in Comparative Example 2-15, if the second intermediate layer was too thick, the crystal orientation degraded. As shown in Comparative Examples 2-16 to 2-21, only low medium SNR was obtained even when the film thickness was varied in the conventional Ru-10 mol % $TiO_2$.

In this example, a glass substrate was used, but the effects of the present invention are not impaired even if an aluminum alloy substrate, a plastic substrate, or a silicon substrate is used. The adhesion layer obtains similar effects even if AlTi, TiCr, AlCr, etc., is used in addition to using NiTa. The seed layer is not limited to NiCrW, and a seed layer based on a material that becomes a fcc structure or another added element may be used. The recording layer consisted of layers in the order of CoCrPt—$SiO_2$—$TiO_2$, CoCrPt—$SiO_2$—$CO_3O_4$, CoCrPt$SiO_2$, CoCrPtB, but a granular recording layer using other oxides may be used. If in the range capable of maintaining the thermal stability, another element such as Ru may be added to CoCrPt to obtain the effects of the present invention.

EXAMPLE 3

Figure 8:
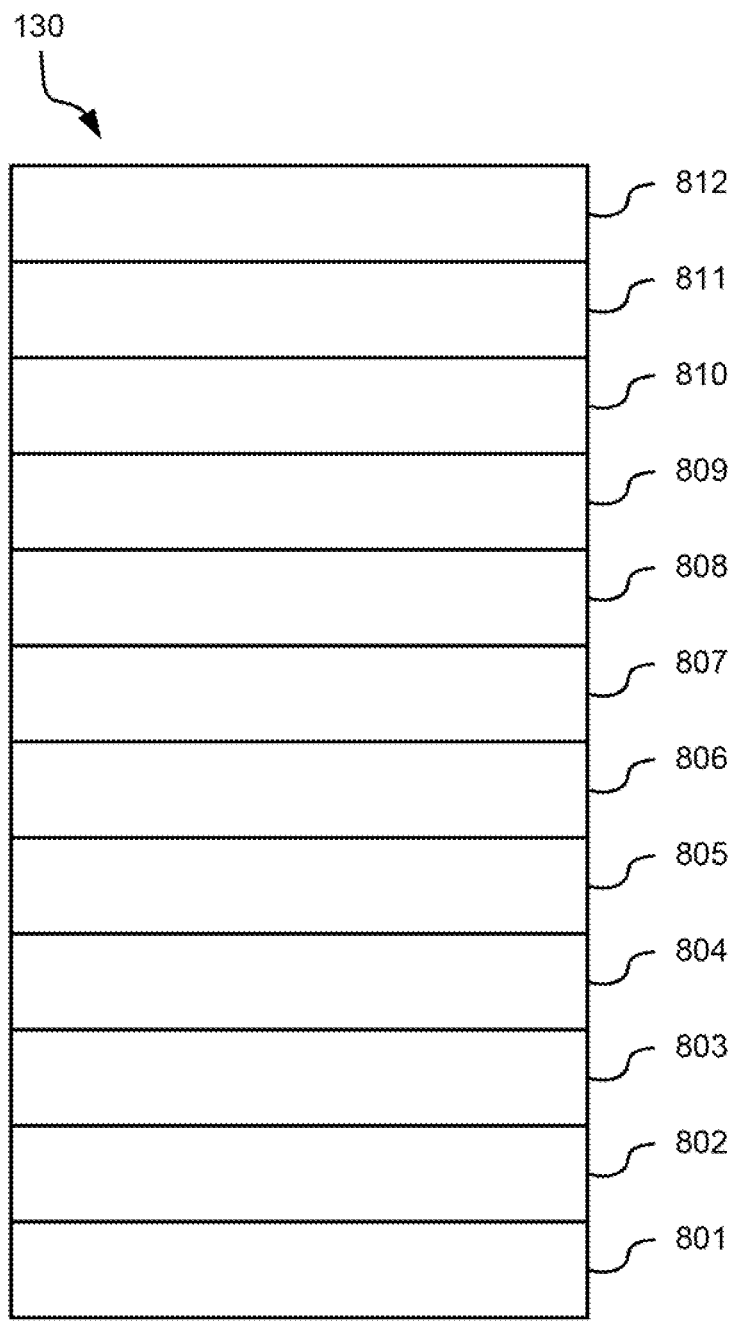
FIG. 8 is a cross-sectional schematic diagram showing the structure of a perpendicular magnetic recording medium, according to one embodiment.

FIG. 8 is a schematic view of a cross section of a perpendicular magnetic recording medium 130, according to one embodiment. A glass substrate having a 0.8 mm thickness and a 65 mm diameter was used as the substrate 801. An adhesion layer 802, with a film thickness of 15 nm comprising an NiTa alloy, was formed under 0.7 Pa Ar gas pressure on substrate 801 to increase adhesion to the substrate 801. Ni-37.5 at. % Ta was used as the NiTa alloy. Under 0.7 Pa Ar gas pressure, a soft magnetic underlayer 803 was then made in a laminated 4-layer structure of CoFeTaZr, Ru, CoFeTaZr, and CoFeTa. 51 at. % Fe-34 at. % Co-10 at. % Ta-5 at. % Zr and Co-9.4 at. % Fe-6 at. % Ta were used as the FeCoTaZr alloy and the CoFeTa alloy, respectively. The film thickness of the lower FeCoTaZr alloy was 20 nm, and the thickness of the Ru layer was 0.4 nm, and the film thickness of the upper FeCoTaZr alloy was 15.8 nm, and Co-9.4 at. % Fe-6 at. % Ta was formed to 7 nm. A seed layer 804 was formed from a 7 nm thick Ni-10 at. % Cr-8 at. % W film. A first intermediate layer 805 was formed from 4 nm thick Ru formed under 1 Pa Ar gas pressure, 5 nm thick Ru formed under 2 Pa Ar gas pressure, and 5 nm thick Ru formed under 4.6 Pa Ar gas pressure. A second intermediate layer 806 was formed by using an Ru alloy target to form a 1 nm thick film under 2.6 Pa Ar gas pressure. A 4.0 nm first recording layer 807 was formed by using a target of Co-10 at. % Cr-22 at. % Pt alloy with 4 mol % $SiO_2$ added, 4 mol % $TiO_2$, and 1.5 mol % $CO_3O_4$ and a gas of 0.5% oxygen mixed in Ar gas under 3.8 Pa pressure. A 4 nm second recording layer 808 was formed by using a target of Co-26 at. % Cr-18 at. % Pt alloy with 4 mol % $SiO_2$ and 2 mol % $CO_3O_4$ added under 3.2 Pa Ar gas pressure. A 4.4 nm third recording layer 809 was formed by using a target of Co-26 at. % Cr-10 at. % Pt alloy with 4 mol % $SiO_2$ and 1 mol % $CO_3O_4$ added under 1.5 Pa Ar gas pressure. A 3.5 nm fourth recording layer 810 was formed by using a Co-15 at. % Cr-14 at. % Pt-8 at. % B alloy target under 0.5 Pa Ar gas pressure. A protective layer 811 was formed from a 2.7 nm thick DLC film. Finally, a lubrication layer 812 was formed by coating a lubricating agent of perfluoroalkyl polyether material diluted by fluorocarbons.

The media for a second intermediate layer 806 were fabricated by using an Ru— 30 at. % Ti alloy target, and Ru-20 at. % Ti-10 mol % TiO$_2$ alloy target, and an Ru-15 at. % Ti-15 mol % TiO$_2$ alloy target and adjusting the amount of oxygen added during the respective sputtering. The table in FIG. 18 lists the magnetic characteristic, (coercive force Hc), crystal orientation (Δθ50), and medium SNR. All of the examples (Examples 3-1 to 3-3) obtained a good medium SNR. In particular, as is clear from Examples 3-2 and 3-3, when a portion of the Ti included in the target was replaced by TiO$_2$, the amount of oxygen supplied during sputtering could be reduced. As is seen from Comparative Examples 3-1 to 3-3, if the amount of oxide contained in the target was too high, the crystal orientation deteriorated, and a high medium SNR could not be obtained. In a preferred embodiment, the amount of oxide contained in the target may be less than half of the added element.

Although Ru—Ti alloy was used as the second intermediate layer in this example, a portion of the elements can be similarly replaced by oxides even when another alloy target is used. For example, if Ru—Nb alloy, Ru-21 at. % Nb-5 mol % Nb$_2$O$_5$ alloy, or Ru-25 at. % Nb-8 mol % Nb$_2$O$_5$ may be used, according to various embodiments. If Ru—Al alloy is used, then Ru-21 at. % Al-5 mol % Al$_2$O$_3$ alloy may be used, according to one embodiment. If an Ru—Ta alloy is used, then Ru-30 at. % Ta-5 mol % Ta$_2$O$_5$ alloy may be used, according to one embodiment. If an Ru—Si alloy is used, then Ru-20 at. % Si-10 mol % SiO$_2$ alloy may be used, according to one embodiment. In addition to these compositions and combinations, other ratios of Ru and the added element and the concentration of oxide may be advantageous, according to various other embodiments.

EXAMPLE 4

In the medium having the structure shown in Example 3, a 1 nm thick second intermediate layer 806 was formed by using an Ru-20 at. % Ti-10 mol % TiO$_2$ alloy target under 2.6 Pa Ar gas pressure, while the seed layer 804 and the first intermediate layer 805 were changed. In addition to the medium SNR, as the overwrite (OW) characteristic, a 4,590 fr/mm signal was written over a 27,560 fr/mm signal, and the ratio of the erased component of the 27,560 fr/mm signal and the signal strength of the 4,590 fr/mm was determined. The table in FIG. 19 shows the results of the recording and playback characteristics.

All of the examples (Examples 4-1 to 4-8) obtained a good medium SNR. In particular, as seen in Examples 4-1 to 4-4, degradation of the medium SNR was not seen even if the film thickness of the first intermediate layer was thinned to 8 nm. As shown in Examples 4-5 to 4-8, the seed layer was NiFeW or CoFeW, and OW improved while a high medium SNR was maintained. The reasons are because the seed layer is a magnetic material, and the essential thickness of the intermediate layer film is reduced. In contrast, in the media in the Comparative Examples using the second intermediate layer having the conventional composition, the medium SNR degraded as the first intermediate layer was thinned. Conversely, a high medium SNR as in the medium in this example could not be obtained even for a thick first intermediate layer. As shown in Comparative Examples 4-5 to 4-8, OW improved when the seed layer was NiFeW, but the medium SNR did not improve.

In this example, the seed layer was NiCrW, NiFeW, or CoFeW, but is not limited to these materials and compositions. Using another material that becomes a fcc structure and composition is also possible, according to various other embodiments.

EXAMPLE 5

Media having the structure shown in Example 3 were fabricated while varying the composition and the film thickness of the first recording layer 807. In addition to the evaluation described above, the resolution (Re) was evaluated as the recording and playback characteristic. A 70,867 fr/mm signal and a 7,874 fr/mm signal were measured, and their ratio was determined.

The table in FIG. 20 lists the characteristic (coercive results of the magnetic force Hc) and recording and playback characteristics. As shown in Examples 5-1 to 5-5, the film thickness was thinned while the oxide concentration in the first recording layer was decreased, and the resolution and medium SNR were found to improve. Degradation of the coercive force and OW was not seen, and KuV/kT, an index of the thermal stability, was approximately 90. Because the oxide concentration in the first recording layer decreased and the magnetic anisotropy improved, the thermal stability could be maintained even for a thin film. In contrast, in Comparative Examples 5-1 to 5-5 which used the second intermediate layer having the conventional composition, the resolution improved, but degradation of the coercive force and the medium SNR was seen. When a conventional second intermediate layer was used, the intergranular interaction strengthened and the noise intensified when the oxide concentration in the first recording layer decreased.

EXAMPLE 6

Figure 9:
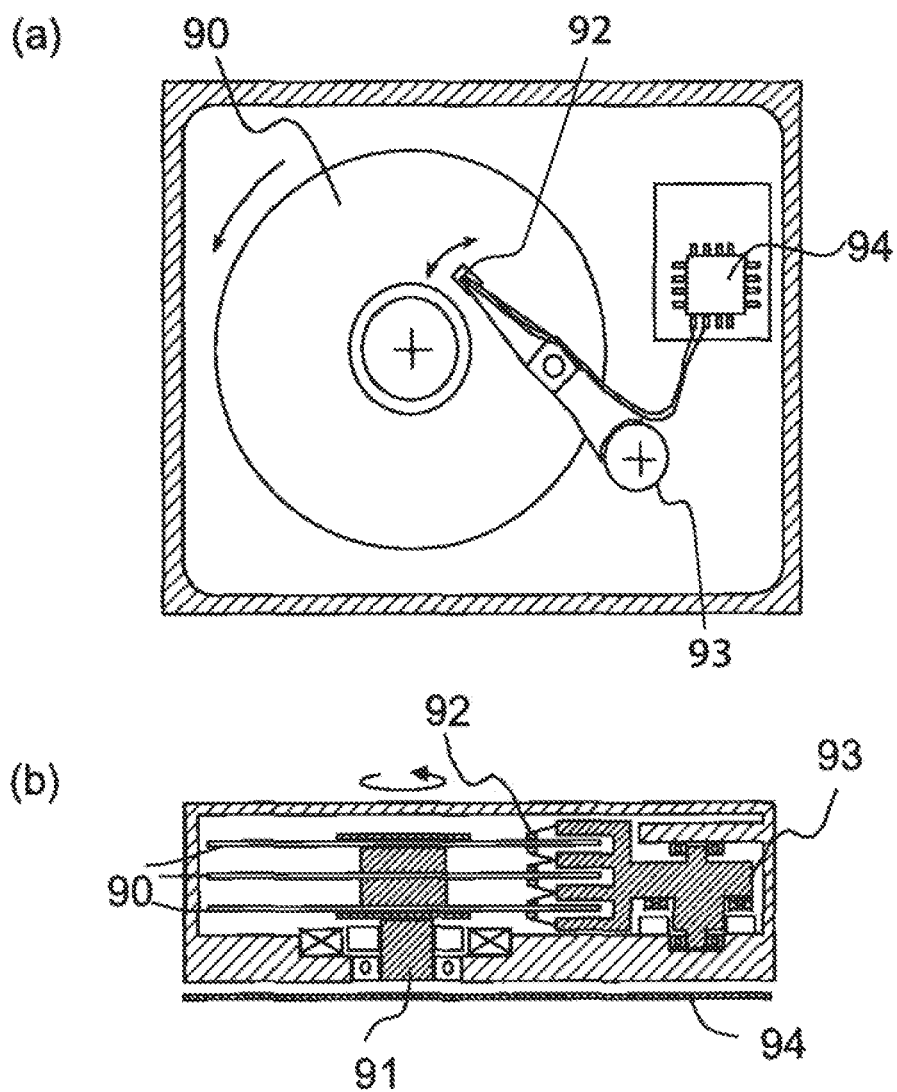
FIG. 9 is a cross-sectional view of a schematic diagram showing a magnetic storage apparatus, according to one embodiment.
Figure 10:
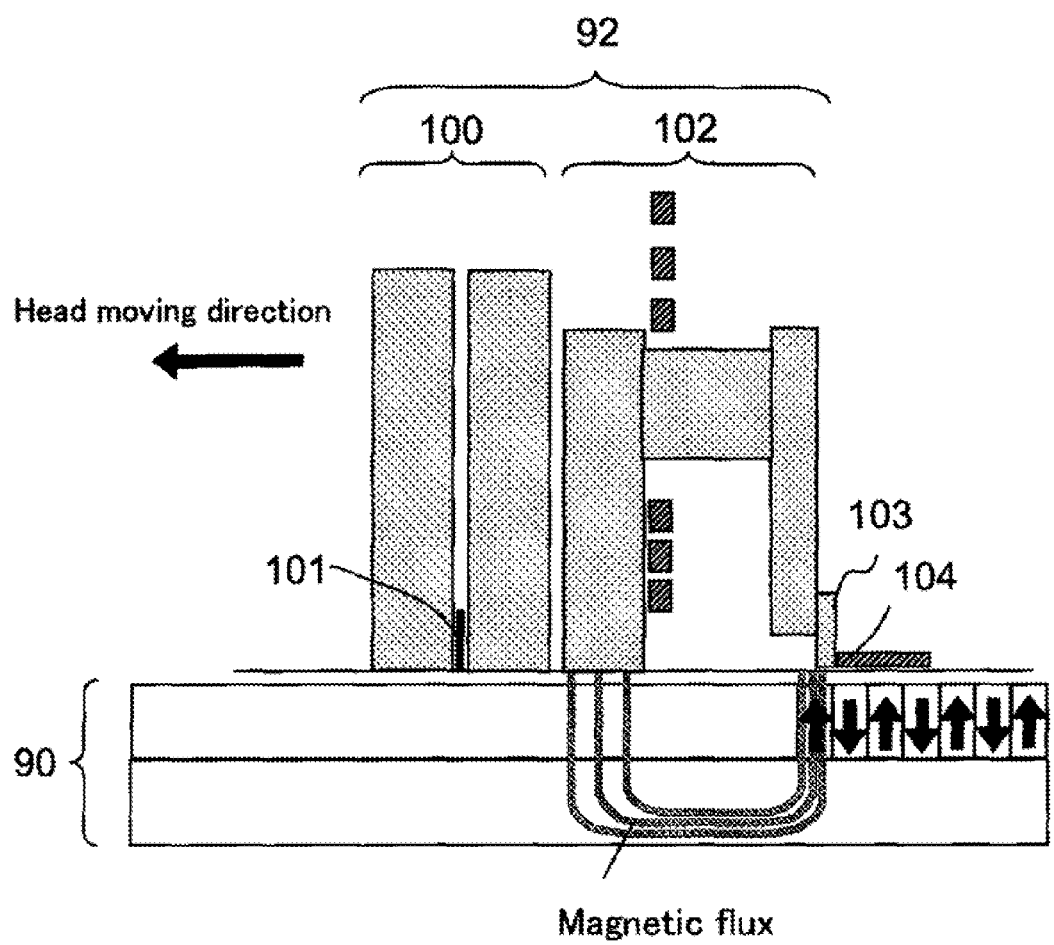
FIG. 10 is a schematic showing a relationship between a magnetic head and a magnetic recording medium, according to one embodiment.

FIG. 9 is a cross-sectional view of a magnetic storage apparatus, according to one embodiment. A magnetic recording medium 90 was constructed from the media described above in the examples, and was comprised of a driver 91 for driving the magnetic storage apparatus, a magnetic head 92 composed of a recording unit and a playback unit, a means 93 for giving relative motion to the magnetic head with respect to the magnetic recording medium, and a means 94 for the input and output of the signals to the magnetic head. FIG. 10 shows a relationship between the magnetic head 82 and the magnetic recording medium 90. The magnetic flying height of the magnetic head was set to 7 nm, a tunnel magnetoresistive (TMR) effect element was used in the playback element 101 of the playback unit 100, and a wrap-around shield 104 was formed in the periphery of the main magnetic pole 103 of the recording unit 102. Thus, the overwrite characteristic could be improved while maintaining a high medium SNR by using a magnetic head formed with a shield surrounding the main magnetic pole of the recording unit. In addition, operation at 121 gigabits per square centimeter was verified by setting a linear recording density of 728,000 bits per 1 cm and a track density of 167,000 tracks per cm.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium, comprising:
   a substrate;
   a soft-magnetic underlayer above the substrate;
   a seed layer above the soft-magnetic underlayer;
   a first intermediate layer above the seed layer;
   a second intermediate layer above the first intermediate layer;
   a recording layer above the second intermediate layer; and
   a protective layer above the recording layer,
   wherein the second intermediate layer comprises an Ru alloy including an element selected from a group consisting of: Ti in a range from about 20 at. % to about 50 at. %, Nb in a range from about 20 at. % to about 50 at. %, Al in a range from about 20 at. % to about 40 at. %, and Ta in a range from about 30 at. % to about 50 at. %,
   wherein the seed layer has a face-centered cubic (fcc) structure and comprises a main component of at least one of: Ni, Cu, Pd, and Pt, and wherein the main component is doped with at least one of: Cr, W, V, Mo, Ta, and Nb.

2. The perpendicular magnetic recording medium as recited in claim 1, wherein a thickness of the soft-magnetic underlayer is in a range from about 20 nm to about 100 nm, wherein the first intermediate layer comprises a Ru alloy including at least one element selected from a group consisting of: Ta, W, Mo, and Nb.

3. The perpendicular magnetic recording medium as recited in claim 1, wherein at least a top portion of the soft-magnetic underlayer has a face-centered cubic (fcc) structure, the fcc structure being adapted for controlling a crystal orientation of the seed layer and having a thickness in a range from about 1 nm to about 10 nm.

4. The perpendicular magnetic recording medium as recited in claim 3, wherein the at least a top portion of the soft-magnetic underlayer that has the fcc structure comprises a main component of CoFe doped with at least one of: Ta, Nb, W, B, and V.

5. The perpendicular magnetic recording medium as recited in claim 1, wherein the soft-magnetic underlayer comprises a main component of at least one of:
   Co, Fe, or CoFe, and wherein the main component is doped with at least one of: Ta, Nb, Zr, B, and Cr.

6. The perpendicular magnetic recording medium as recited in claim 1, wherein a thickness of the seed layer is in a range from about 2 nm to about 10 nm.

7. The perpendicular magnetic recording medium as recited in claim 1, wherein a thickness of the seed layer is in a range from about 1 nm to about 4 nm.

8. The perpendicular magnetic recording medium as recited in claim 1, wherein the first intermediate layer has a hexagonal close packed (hcp) structure and comprises Ru or an Ru alloy including at least one element selected from a group consisting of: Cr, Ta, W, Mo, Nb, and Co.

9. The perpendicular magnetic recording medium as recited in claim 8, wherein a thickness of the first intermediate layer is in a range from about 8 nm to about 20 nm.

10. The perpendicular magnetic recording medium as recited in claim 1, wherein the second intermediate layer comprises an oxide of the element at no more than about 40 vol.% of a total of the element.

11. The perpendicular magnetic recording medium as recited in claim 1, wherein a thickness of the second intermediate layer is in a range from about 0.5 nm to about 2 nm.

12. The perpendicular magnetic recording medium as recited in claim 1, wherein the recording layer comprises crystal grains of at least one of Co and Pt doped with at least one of: Cr, Ti, Ta, Ru, W, Mo, Cu, and B, the crystal grains being surrounded by at least one oxide, the oxide comprising any of Si, Ti, Ta, B, Cr, Mo, W, and Nb.

13. The perpendicular magnetic recording medium as recited in claim 12, wherein the recording layer comprises a plurality of layers, and wherein a concentration of the crystal grains of at least one of Co and Pt are varied across the plurality of layers.

14. The perpendicular magnetic recording medium as recited in claim 1, wherein the protective layer comprises diamond like carbon having a thickness in a range from about 2 nm to about 5 nm.

15. A magnetic data storage system, comprising:
   a magnetic medium as recited in claim 1;
   at least one magnetic head for reading from/writing to the magnetic medium;
   a drive mechanism for passing the magnetic medium over the at least one magnetic head; and
   a controller electrically coupled to the at least one magnetic head for controlling operation of the at least one magnetic head.

16. A perpendicular magnetic recording medium, comprising:
   an adhesion layer above a substrate, the adhesion layer having a thickness in a range from about 2 nm to about 40 nm;
   a soft-magnetic underlayer above the adhesion layer, wherein a thickness of the soft-magnetic underlayer is in a range from about 20 nm to about 100 nm;
   a seed layer above the soft-magnetic underlayer;
   a first intermediate layer above the seed layer, the first intermediate layer having a hexagonal close packed (hcp) structure and comprising Ru or an Ru alloy including at least one element selected from a group consisting of: Cr, Ta, W, Mo, Nb, and Co, wherein a thickness of the first intermediate layer is in a range from about 8 nm to about 20 nm;
   a second intermediate layer above the first intermediate layer, the second intermediate layer comprising a Ru alloy not having a hexagonal close packed (hcp) structure and including an element selected from a group consisting of: Ti in a range from about 20 at. % to about 50 at. %, Nb in a range from about 20 at. % to about 50 at. %, Al in a range from about 20 at. % to about 40 at. %, Ta in a range from about 30 at. % to about 50 at. %, wherein a thickness of the second intermediate layer is in a range from about 0.5 nm to about 2 nm;
   a recording layer above the second intermediate layer, the recording layer comprising crystal grains of at least one of Co and Pt doped with at least one of: Cr, Ti, Ta, Ru, W, Mo, Cu, and B, the crystal grains being surrounded by at least one oxide, the oxide comprising any of Si, Ti, Ta, B, Cr, Mo, W, and Nb, wherein the recording layer comprises a plurality of layers, and wherein a concentration of the crystal grains of at least one of Co and Pt are varied across the plurality of layers; and
   a protective layer above the recording layer, the protective layer comprising diamond like carbon having a thickness in a range from about 2 nm to about 5 nm.

17. The perpendicular magnetic recording medium as recited in claim 16, wherein the second intermediate layer comprises the Ti in the range from about 20 at. % to about 50 at. %.

18. The perpendicular magnetic recording medium as recited in claim 16, wherein the second intermediate layer comprises the Nb in the range from about 20 at. % to about 50 at. %.

19. The perpendicular magnetic recording medium as recited in claim 16, wherein the second intermediate layer comprises the Al in the range from about 20 at. % to about 40 at. %.

20. The perpendicular magnetic recording medium as recited in claim 16, wherein the second intermediate layer comprises the Ta in the range from about 30 at. % to about 50 at. %.

21. The perpendicular magnetic recording medium as recited in claim 16, wherein at least a top portion of the soft-magnetic underlayer has a face-centered cubic (fcc) structure, the fcc structure being adapted for controlling a crystal orientation of the seed layer and having a thickness in a range from about 1 nm to about 10 nm; wherein the at least a top portion of the soft-magnetic underlayer that has the fcc structure comprises a main component of CoFe doped with at least one of: Ta, Nb, W, B, and V; wherein the soft-magnetic underlayer comprises a main component of at least one of: Co, Fe, or CoFe, and wherein the main component is doped with at least one of: Ta, Nb, Zr, B, and Cr; wherein the seed layer has a face-centered cubic (fcc) structure and comprises a main component of at least one of: Ni, Cu, Pd, and Pt, wherein the main component is doped with at least one of: Cr, W, V, Mo, Ta, and Nb, and wherein the seed layer has a thickness in a range from about 2 nm to about 10 nm.

22. A magnetic data storage system, comprising:
a magnetic medium as recited in claim 16;
at least one magnetic head for reading from/writing to the magnetic medium;
a drive mechanism for passing the magnetic medium over the at least one magnetic head; and
a controller electrically coupled to the at least one magnetic head for controlling operation of the at least one magnetic head.

23. The perpendicular magnetic recording medium as recited in claim 1, further comprising:
an adhesion layer above the substrate, the adhesion layer having a thickness in a range from about 2 nm to about 40 nm;
a thickness of the soft-magnetic underlayer is in a range from about 20 nm to about 100 nm;
the first intermediate layer having a hexagonal close packed (hcp) structure and comprising Ru or an Ru alloy including at least one element selected from a group consisting of: Cr, Ta, W, Mo, Nb, and Co, wherein a thickness of the first intermediate layer is in a range from about 8 nm to about 20 nm;
a thickness of the second intermediate layer is in a range from about 0.5 nm to about 2 nm; and
the recording layer comprises crystal grains of at least one of Co and Pt doped with at least one of: Cr, Ti, Ta, Ru, W, Mo, Cu, and B, the crystal grains being surrounded by at least one oxide, the oxide comprising any of Si, Ti, Ta, B, Cr, Mo, W, and Nb, wherein the recording layer comprises a plurality of layers.

* * * * *

UNITED STATES PATENT AND TRADEMARK OFFICE
CERTIFICATE OF CORRECTION

PATENT NO. : 8,592,060 B2
APPLICATION NO. : 12/975197
DATED : November 26, 2013
INVENTOR(S) : Tamai et al.

It is certified that error appears in the above-identified patent and that said Letters Patent is hereby corrected as shown below:

In the specification:

col. 3, line 39 replace "11c" with --Hc--;

col. 4, line 2 replace "HO" with --Hc--;

col. 10, line 27 replace "He" with --Hc--;

col. 11, line 49 replace "11c" with --Hc--;

col. 13, line 16 replace "SNR. in" with --SNR. In--.

Signed and Sealed this
Eighteenth Day of February, 2014

Michelle K. Lee
*Deputy Director of the United States Patent and Trademark Office*